United States Patent
Huang et al.

(10) Patent No.: US 11,716,186 B2
(45) Date of Patent: Aug. 1, 2023

(54) VALIDATION FOR CONTROL INFORMATION FOR SEMI-PERSISTENT SCHEDULING CANCELLATION

(71) Applicant: QUALCOMM Incorporated, San Diego, CA (US)

(72) Inventors: Yi Huang, San Diego, CA (US); Jing Sun, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/507,630

(22) Filed: Oct. 21, 2021

(65) Prior Publication Data
US 2022/0131673 A1 Apr. 28, 2022

Related U.S. Application Data

(60) Provisional application No. 63/104,454, filed on Oct. 22, 2020.

(51) Int. Cl.
| | |
|---|---|
| H04L 5/00 | (2006.01) |
| H04W 72/00 | (2023.01) |
| H04L 1/00 | (2006.01) |
| H04W 72/23 | (2023.01) |

(52) U.S. Cl.
CPC ............ *H04L 5/0053* (2013.01); *H04L 1/001* (2013.01); *H04L 1/0004* (2013.01); *H04W 72/23* (2023.01)

(58) Field of Classification Search
CPC ..... H04L 5/0053; H04L 1/0004; H04L 1/001; H04W 72/042; H04W 72/1289
See application file for complete search history.

(56) References Cited

U.S. PATENT DOCUMENTS

| 2017/0181155 A1 | 6/2017 | Chen et al. |
| 2021/0219329 A1 | 7/2021 | Zhou et al. |
| 2021/0352694 A1* | 11/2021 | Saber ............ H04B 7/024 |
| 2022/0070837 A1* | 3/2022 | Yang ............ H04W 72/042 |

FOREIGN PATENT DOCUMENTS

| CA | 3123765 A1 | 7/2020 |
| KR | 20200018353 A | 2/2020 |
| WO | 2020204491 A1 | 10/2020 |

OTHER PUBLICATIONS

International Search Report and Written Opinion—PCT/US2021/056296—ISA/EPO—dated Feb. 8, 2022.

* cited by examiner

*Primary Examiner* — Ronald B Abelson
(74) *Attorney, Agent, or Firm* — Loza & Loza, LLP

(57) ABSTRACT

Control information such as downlink control information (DCI) may be used to indicate whether the DCI is for semi-persistent scheduling (SPS) cancellation. For example, the base station may transmit, to a user equipment (UE), first DCI to trigger an SPS configuration of a plurality of SPS occasions. The base station may further determine to cancel one or more SPS occasions of the plurality of SPS occasions, and transmit second DCI to trigger an SPS cancellation that cancels the one or more SPS occasions, the second DCI including at least a redundancy version field including one or more redundancy version values to indicate the SPS cancellation.

26 Claims, 14 Drawing Sheets

US 11,716,186 B2

VALIDATION FOR CONTROL INFORMATION FOR SEMI-PERSISTENT SCHEDULING CANCELLATION

PRIORITY CLAIM

This application claims priority to and the benefit of provisional patent application No. 63/104,454 filed in the United States Patent & Trademark Office on Oct. 22, 2020, the entire content of which is incorporated herein by reference as if fully set forth below in its entirety and for all applicable purposes.

TECHNICAL FIELD

The technology discussed below relates generally to wireless communication systems, and more particularly, to a method and apparatus for utilizing control information to cancel one or more semi-persistent scheduling (SPS) occasions in a wireless communication system.

INTRODUCTION

In a wireless communication system, a base station can schedule communication resources for user equipment (UE) using dynamic scheduling or semi-persistent scheduling. Dynamic scheduling is a mechanism in which the base station schedules the downlink (e.g., physical downlink shared channel (PDSCH)) or uplink (e.g., the physical uplink shared channel (PUSCH)) data in each subframe, for example, using downlink control information (DCI). Dynamic scheduling provides the network with flexibility in assigning communication resources to the UE at the cost of increased control signaling overhead to transmit scheduling information for each uplink or downlink transmission.

To reduce communication overhead, the base station can allocate communication resources on a semi-persistent basis. Semi-persistent scheduling (SPS) is a mechanism in which the base station schedules an uplink/downlink transmission using a semi-static control message (e.g., radio resource control (RRC) message). SPS can significantly reduce control signaling overhead because the base station does not need to transmit scheduling information (e.g., grant) for each uplink or downlink communication. In this disclosure, SPS and configured scheduling may be used interchangeably.

SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide a method, system, device, and apparatus for utilizing downlink control information (DCI) to indicate semi-persistent scheduling (SPS) cancellation of one or more SPS occasions. A base station may include particular values for one or more of a redundancy value field, a modulation and coding scheme (MCS) field, and a frequency domain resource allocation (FDRA) field within the DCI to indicate SPS cancellation. The UE may receive DCI and determine whether the DCI is for the SPS cancellation based on the particular values in the one or more of the redundancy value field, the MCS field, and the FDRA field to indicate SPS cancellation.

In one example, a method of wireless communication by a base station is disclosed. The method includes transmitting, to a user equipment (UE), first DCI to trigger an SPS configuration of a plurality of SPS occasions, determining to cancel one or more SPS occasions of the plurality of SPS occasions, and transmitting second DCI to trigger an SPS cancellation that cancels the one or more SPS occasions, the second DCI including at least a redundancy version field including one or more redundancy version values to indicate the SPS cancellation.

In another example, a base station for wireless communication is disclosed. The base station includes at least one processor, a transceiver communicatively coupled to the at least one processor, and a memory communicatively coupled to the at least one processor. The at least one processor may be configured to transmit, to a UE, first DCI to trigger an SPS configuration of a plurality of SPS occasions, determine to cancel one or more SPS occasions of the plurality of SPS occasions, and transmit second DCI to trigger an SPS cancellation that cancels the one or more SPS occasions, the second DCI including at least a redundancy version field including one or more redundancy version values to indicate the SPS cancellation.

In another example, a non-transitory processor-readable storage medium having instructions for a base station thereon may be disclosed. The instructions, when executed by a processing circuit, cause the processing circuit to transmit, to a UE, first DCI to trigger an SPS configuration of a plurality of SPS occasions, determine to cancel one or more SPS occasions of the plurality of SPS occasions, and transmit second DCI to trigger an SPS cancellation that cancels the one or more SPS occasions, the second DCI including at least a redundancy version field including one or more redundancy version values to indicate the SPS cancellation.

In a further example, a base station for wireless communication may be disclosed. The base station includes means for transmitting, to a UE, first DCI to trigger an SPS configuration of a plurality of SPS occasions, means for determining to cancel one or more SPS occasions of the plurality of SPS occasions, and means for transmitting second DCI to trigger an SPS cancellation that cancels the one or more SPS occasions, the second DCI including at least a redundancy version field including one or more redundancy version values to indicate the SPS cancellation.

In one example, a method of wireless communication by a user equipment (UE) is disclosed. The method includes receiving first DCI to trigger an SPS configuration of a plurality of SPS occasions, receiving second DCI including at least a redundancy version field including one or more redundancy version values, determining whether the second DCI indicates SPS cancellation that cancels one or more SPS occasions of the plurality of SPS occasions based at least on the one or more redundancy version values, and refraining from monitoring the one or more SPS occasions based on determining that the second DCI indicates the SPS cancellation.

In another example, a UE for wireless communication is disclosed. The UE includes at least one processor, a transceiver communicatively coupled to the at least one processor, and a memory communicatively coupled to the at least one processor. The at least one processor may be configured to receive first DCI to trigger an SPS configuration of a plurality of SPS occasions, receive second DCI including at least a redundancy version field including one or more redundancy version values, determine whether the second DCI indicates SPS cancellation that cancels one or more SPS occasions of the plurality of SPS occasions based at least on the one or more redundancy version values, and refrain from monitoring the one or more SPS occasions based on determining that the second DCI indicates the SPS cancellation.

In another example, a non-transitory processor-readable storage medium having instructions for UE thereon may be disclosed. The instructions, when executed by a processing circuit, cause the processing circuit to receive first DCI to trigger an SPS configuration of a plurality of SPS occasions, receive second DCI including at least a redundancy version field including one or more redundancy version values, determine whether the second DCI indicates SPS cancellation that cancels one or more SPS occasions of the plurality of SPS occasions based at least on the one or more redundancy version values, and refrain from monitoring the one or more SPS occasions based on determining that the second DCI indicates the SPS cancellation.

In a further example, a UE for wireless communication may be disclosed. The base station includes means for receiving first DCI to trigger an SPS configuration of a plurality of SPS occasions, means for receiving second DCI including at least a redundancy version field including one or more redundancy version values, means for determining whether the second DCI indicates SPS cancellation that cancels one or more SPS occasions of the plurality of SPS occasions based at least on the one or more redundancy version values, and means for refraining from monitoring the one or more SPS occasions based on determining that the second DCI indicates the SPS cancellation.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
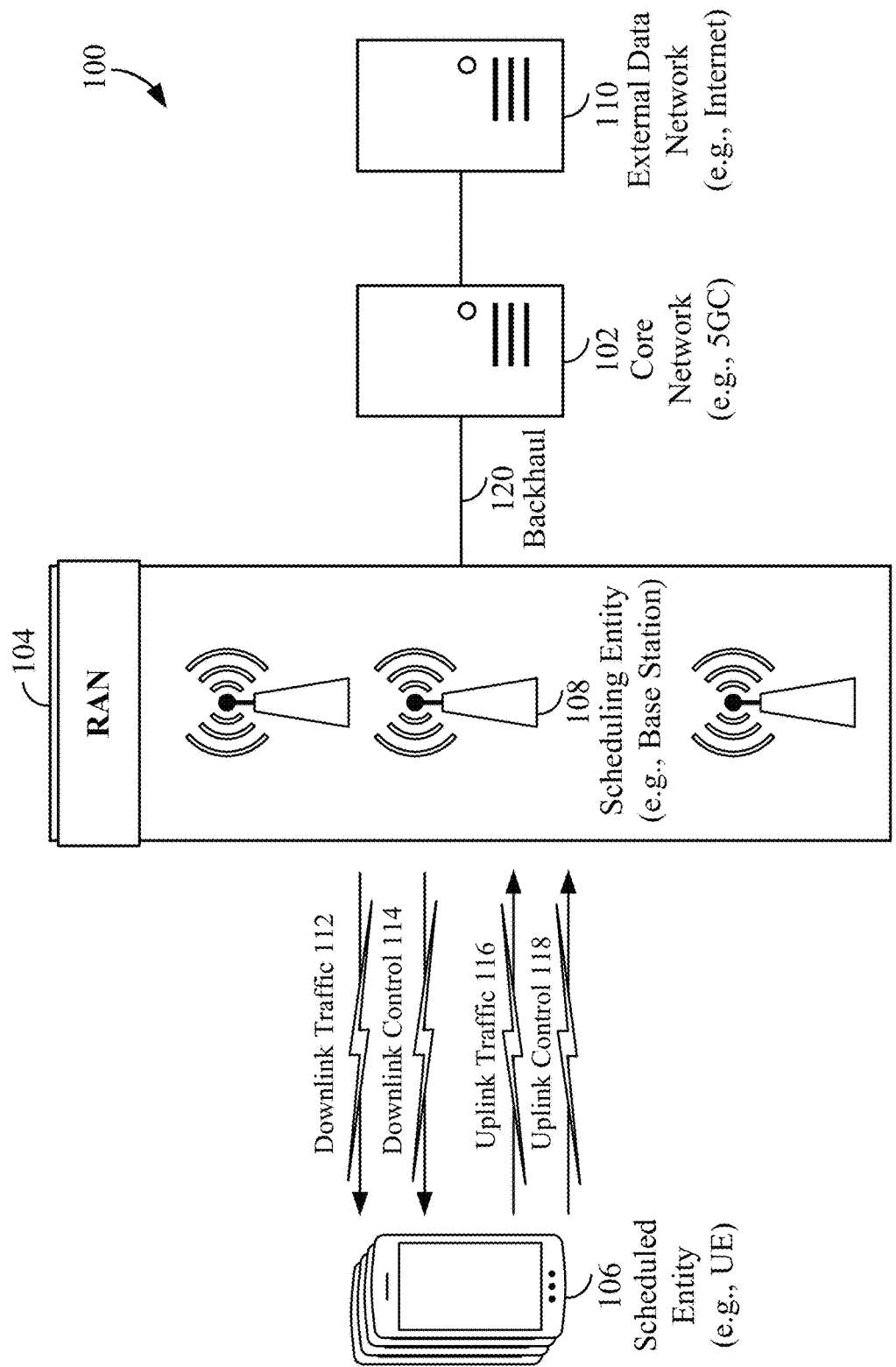
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The base station may transmit downlink control information (DCI) for SPS-related tasks. For example, DCI for SPS activation may be used to activate monitoring SPS occasions, DCI for SPS release may deactivate monitoring SPS occasions, and DCI for SPS cancellation may cancel one or more SPS occasions. After validating that DCI received at a user equipment (UE) is DCI for SPS, the UE may further determine a type of SPS-related DCI based on values in one or more fields provided in the DCI. According to some aspects of the disclosure, to indicate SPS cancellation, the base station may include particular values at least for a redundancy value field to indicate SPS cancellation. For example, to indicate SPS cancellation, at least one of the values in the redundancy value field may be one. In some aspects, the base station may include particular values for the redundancy value field and a modulation and coding scheme (MCS) field within the DCI to indicate SPS cancellation. For example, to indicate SPS cancellation, at least one of the values in the redundancy value field may be one, and at least one of the values in the MCS field may be zero. In some aspects, the base station may include particular values for the redundancy value field, an MCS field, and a frequency domain resource allocation (FDRA) field within the DCI to indicate SPS cancellation. For example, to indicate SPS cancellation, at least one of the values in the redundancy value field may be one, at least one of the values in the MCS field may be zero, and the values in the FDRA field may be set to an invalid value. When the UE receives the DCI, the UE may determine whether the DCI is for SPS cancellation based on the particular values in one or more of the redundancy value field, the MCS field, and the FDRA field to indicate SPS cancellation.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 can transmit uplink control information 118 to the network (e.g., scheduling entity 108).

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
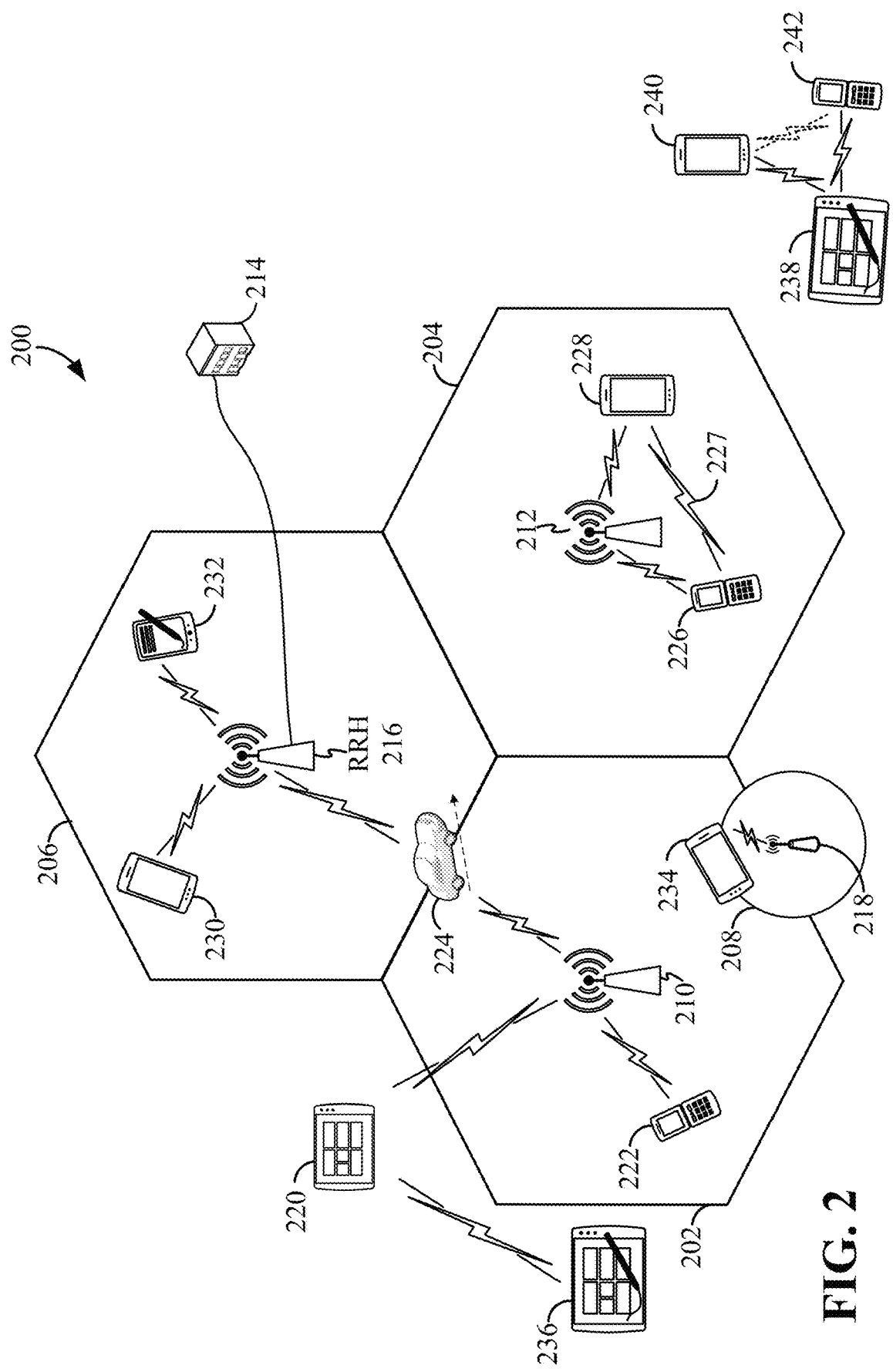
FIG. 2 is an illustration of an example of a radio access network according to some aspects.

FIG. 2 is an illustration of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from the base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 3:
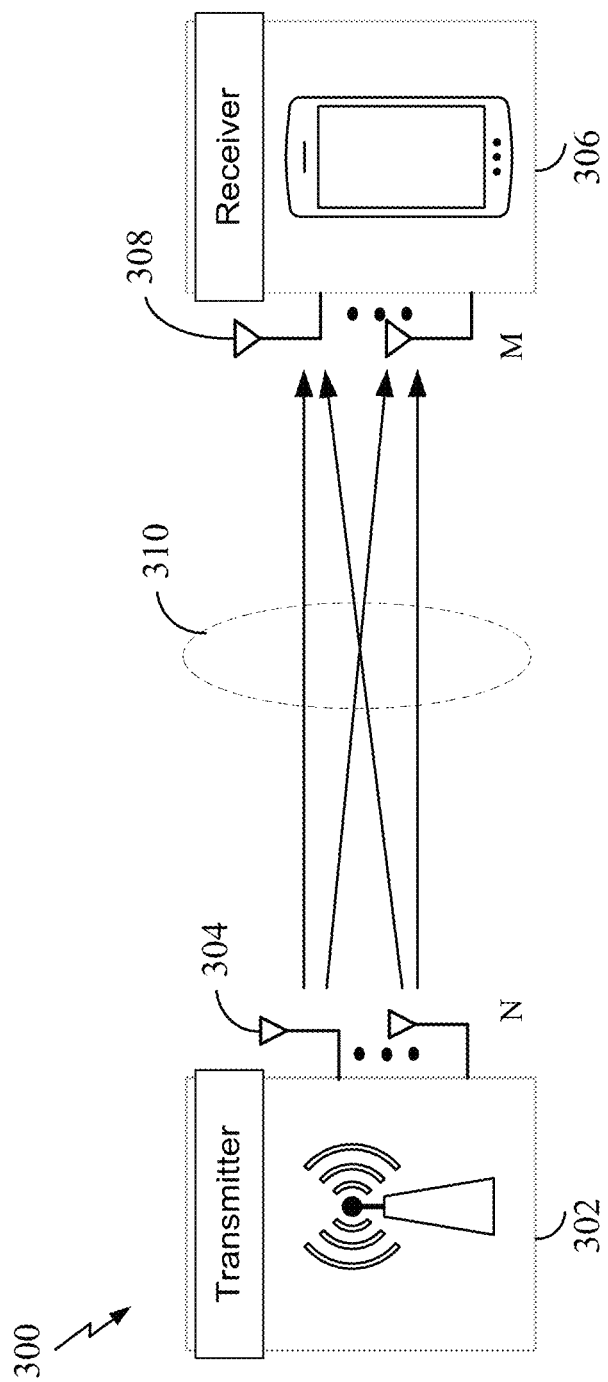
FIG. 3 is a block diagram illustrating a transmitting device and a receiving device supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit demodulation reference signal (DMRS) and/or channel-state information reference signals (CSI-RS) with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated by an example diagram 400 in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms as well as other waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., physical downlink control channel (PDCCH)), and the data region 414 may carry data channels (e.g., PDCCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
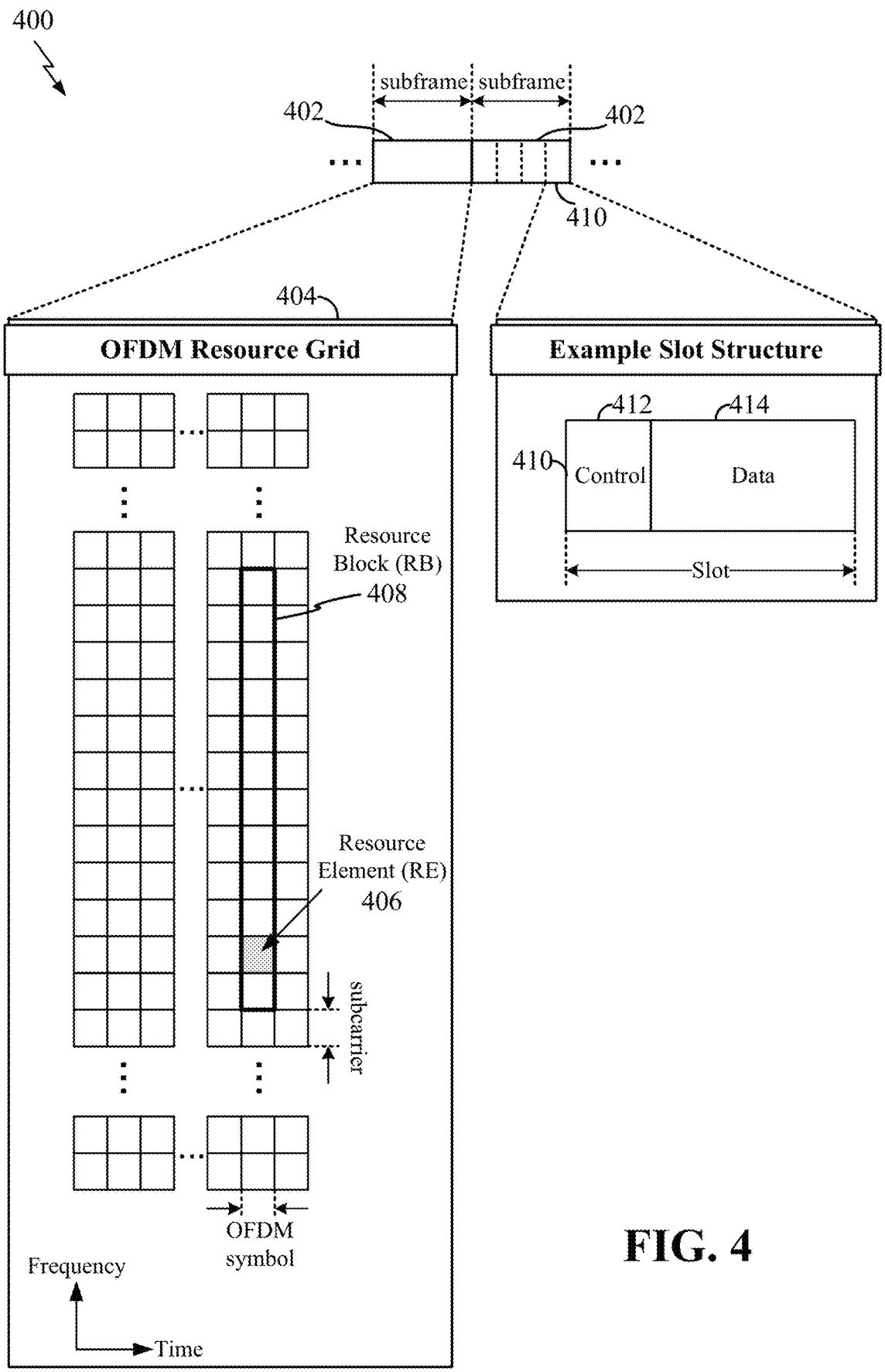
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DMRS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure. The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information (UCI) 118. The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DMRS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Scheduling is a process of allocating communication resources (e.g., time, frequency, and spatial resources) in a wireless communication system 100. A scheduling entity 108 (e.g., base station such as a gNB or an eNB) can schedule communication resources using a dynamic scheduling method or semi-persistent scheduling (SPS) method. In dynamic scheduling, the scheduling entity can schedule resources for each data communication (e.g., PDSCH/PUSCH, and PUCCH) using DCI. To reduce communication overhead, the scheduling entity can schedule resources in a semi-static or semi-persistent manner using SPS. For example, using SPS, the scheduling entity can configure one or more SPS occasions using one or more radio resource control (RRC) messages (e.g., SPS-Config). Each SPS occasion can include downlink (DL) resources and/or uplink (UL) resources. Using SPS, the scheduling entity transmits a single trigger signal (e.g., DCI) for one or more SPS occasions configured in an SPS configuration.

Figure 5:
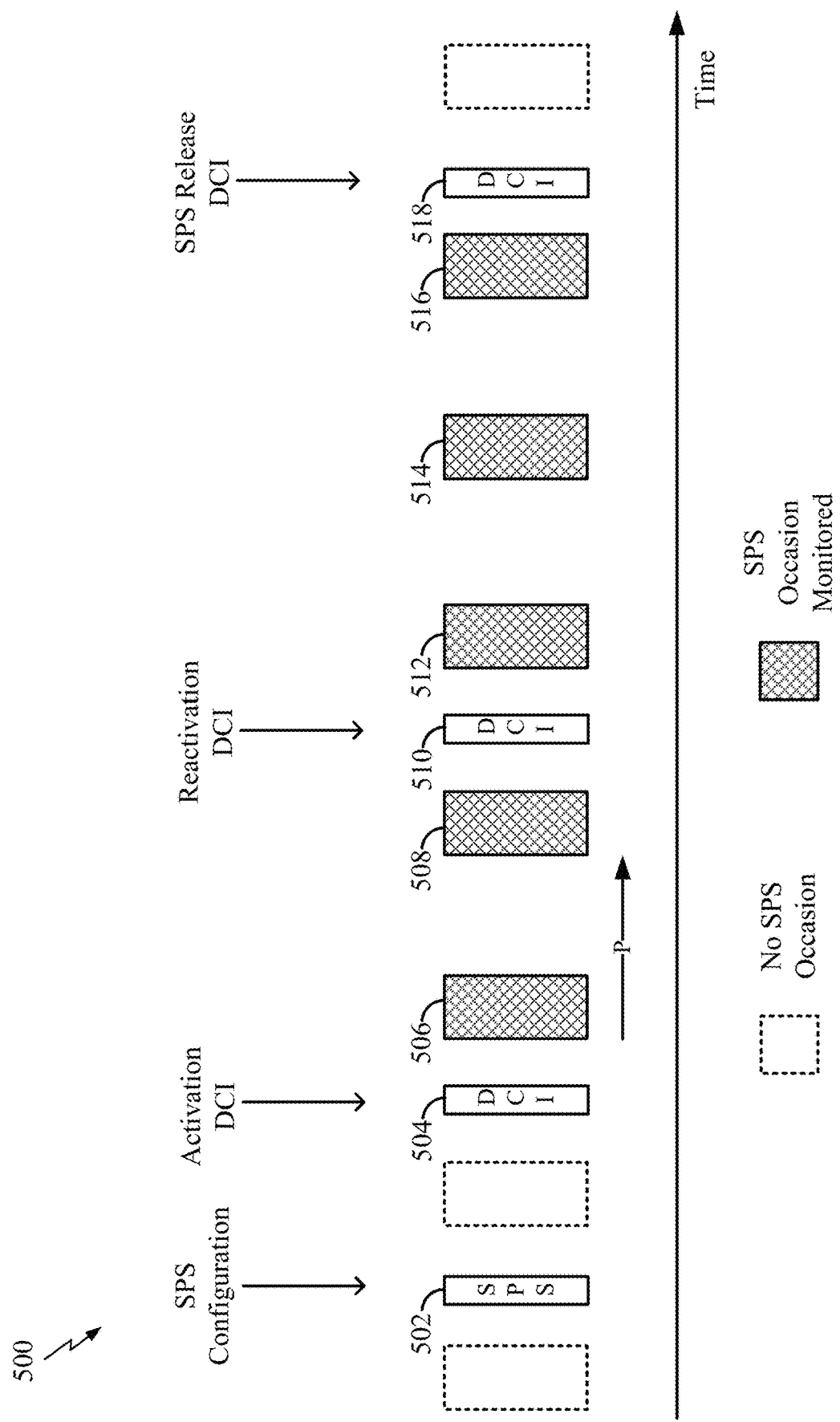
FIG. 5 is a diagram illustrating an exemplary semi-persistent scheduling (SPS) configuration for wireless communication according to some aspects.

FIG. 5 is an example diagram 500 illustrating an exemplary SPS configuration for wireless communication according to some aspects. A base station (e.g., scheduling entity 108) can transmit one or more SPS configurations to a UE (e.g. UE 106) using SPS signaling 502. In one example, the SPS signaling 502 may be an RRC message that configures one or more SPS configurations. Each SPS configuration can be identifiable by a corresponding index value (e.g., index 0 for SPS configuration 0 and index 1 for SPS configuration 1). In some aspects, the base station can use a different index for each SPS configuration.

In some aspects, the same index can be used for a data SPS configuration for downlink data and a measurement SPS configuration for channel/interference measurements. The base station can configure both types of SPS configurations using RRC and/or MAC CE signaling. In addition to the SPS configuration index, the base station can include a field in a DCI to indicate whether the index signals the data SPS configuration or measurement SPS configuration. Therefore, the UE can determine whether the downlink data SPS configuration or the measurement SPS configuration is triggered by the index, and use the corresponding periodicity and feedback timing.

In some aspects, the RRC message may include a different index to identify each configured SPS configuration. An SPS configuration can schedule and allocate communication resources (e.g., time, frequency, and spatial resources) to SPS occasions that have a predetermined periodicity P. The base station can configure multiple SPS configurations for downlink data and/or channel measurements. From the index, the UE can identify a triggered SPS configuration and use the corresponding periodicity and feedback timing. In some aspects, an SPS configuration can include both downlink data and channel measurement resources across different SPS occasions. In some aspects, the SPS configuration may further allocate communication resources for transmitting HARQ feedback such as HARQ ACK or HARQ NACK.

After the SPS configuration(s) are configured, the base station can transmit activation DCI 504 (e.g., in a PDCCH) to activate the configured SPS configuration(s) at the UE. No SPS occasions may be monitored by the UE prior to receiving the activation DCI 504. The activation DCI 504 may activate at least one SPS configuration, e.g., by indicating an index of an SPS configuration to be activated. In some examples, the activation DCI 504 can include one or more indexes to trigger one or more corresponding SPS configurations. In some examples, the activation DCI 504 may further indicate an index of an SPS configuration that is deactivated or reactivated. In some aspects, the activation DCI 504 may further indicate transmission parameters, such as MCS, resource allocations, antenna ports of an SPS transmission, DMRS configuration, beamforming, precoding, etc.

In some aspects, the base station can configure a set of bitmaps for triggering the combined SPS configuration, and use DCI to select one of the bitmaps to trigger the desired SPS occasions corresponding to the selected bitmap. The base station can use RRC or MAC CE to communicate the set of bitmaps to the UE to reduce the DCI payload. In some aspects, the bitmap can be a part of an SPS configuration. In this case, the base station can signal the selected bitmap using a bitmap index in the DCI.

The base station can use the activation DCI 504 to configure one or more transmission parameters, for example, MCS, resource allocations, antenna ports of an SPS transmission, DMRS configuration, beamforming, precoding, etc. For each activated SPS configuration, the UE can use PUCCH occasions for transmitting uplink control information (UCI) that may include HARQ feedback, scheduling request (SR), and a channel report that can include channel characteristic measurements and/or interference measurements.

A base station can use the above described SPS configurations or the like to efficiently schedule frequent or periodic channel and interference measurements with low signaling overhead. Therefore, the base station can have more up-to-date information on the channel characteristics from the UE's point of view. The UE measurements can help the base station in channel precoding, interference/noise/channel estimation and prediction, and MCS and transmission configuration selection. The UE also benefits from having up-to-date information on the channel characteristics, which can enhance noise/interference/channel estimation over time. Having up-to-date channel and interference information also enhances data decoding and can result in a lower error rate and a higher data rate.

In FIG. 5, after the activation DCI 504 activates a particular SPS configuration, the UE monitors SPS occasions such as SPS occasions 506 and 508, which have the periodicity P between successive SPS occasions (e.g., based on the particular SPS configuration). After the SPS occasion 508, the base station transmits reactivation DCI 510 to reactivate the configured SPS configuration(s) at the UE. In some examples, the reactivation DCI 510 may reactivate the configured SPS configuration by reconfiguring transmission parameters such as an MCS, resource allocations, antenna ports of an SPS transmission, a DMRS configuration, beamforming, precoding, etc. After receiving the reactivation DCI 510, the UE may monitor subsequent SPS occasions such as SPS occasions 512, 514, and 516, according to the parameters indicated in the reactivation DCI 510. For example, the SPS occasions 512, 514, and 516 may be monitored using the reconfigured transmission parameters according to the reactivation DCI 510.

When the UE receives an SPS release DCI 518, the UE deactivates the configured SPS configuration. For example, when the UE receives the SPS release DCI 518, the UE stops monitoring subsequent SPS occasions.

In some cases, after the SPS configuration is activated, the base station may transmit SPS cancellation DCI to cause the base station to cancel one or more subsequent SPS occasions. The SPS cancellation DCI may indicate a number of SPS occasions to cancel. When the SPS cancellation DCI is received, the UE may skip monitoring an SPS occasion cancelled by the SPS cancellation DCI. For example, if the SPS cancellation DCI indicates one SPS occasion being cancelled, then the UE may skip monitoring one subsequent SPS occasion cancelled by the SPS cancellation DCI. In some aspects, the base station may transmit the SPS cancellation DCI to the UE when the base station does not have data to transmit to the UE. The SPS cancellation DCI is different from the SPS release DCI in that the SPS cancellation DCI indicates a defined number of SPS occasions to skip monitoring, while the SPS release DCI indefinitely deactivates monitoring for any subsequent SPS occasions until another activation DCI is received. For example, when the UE receives the SPS cancellation DCI, the UE may skip monitoring one or more subsequent SPS occasions cancelled by the SPS cancellation DCI, and then resume monitoring SPS occasions.

Figure 6:
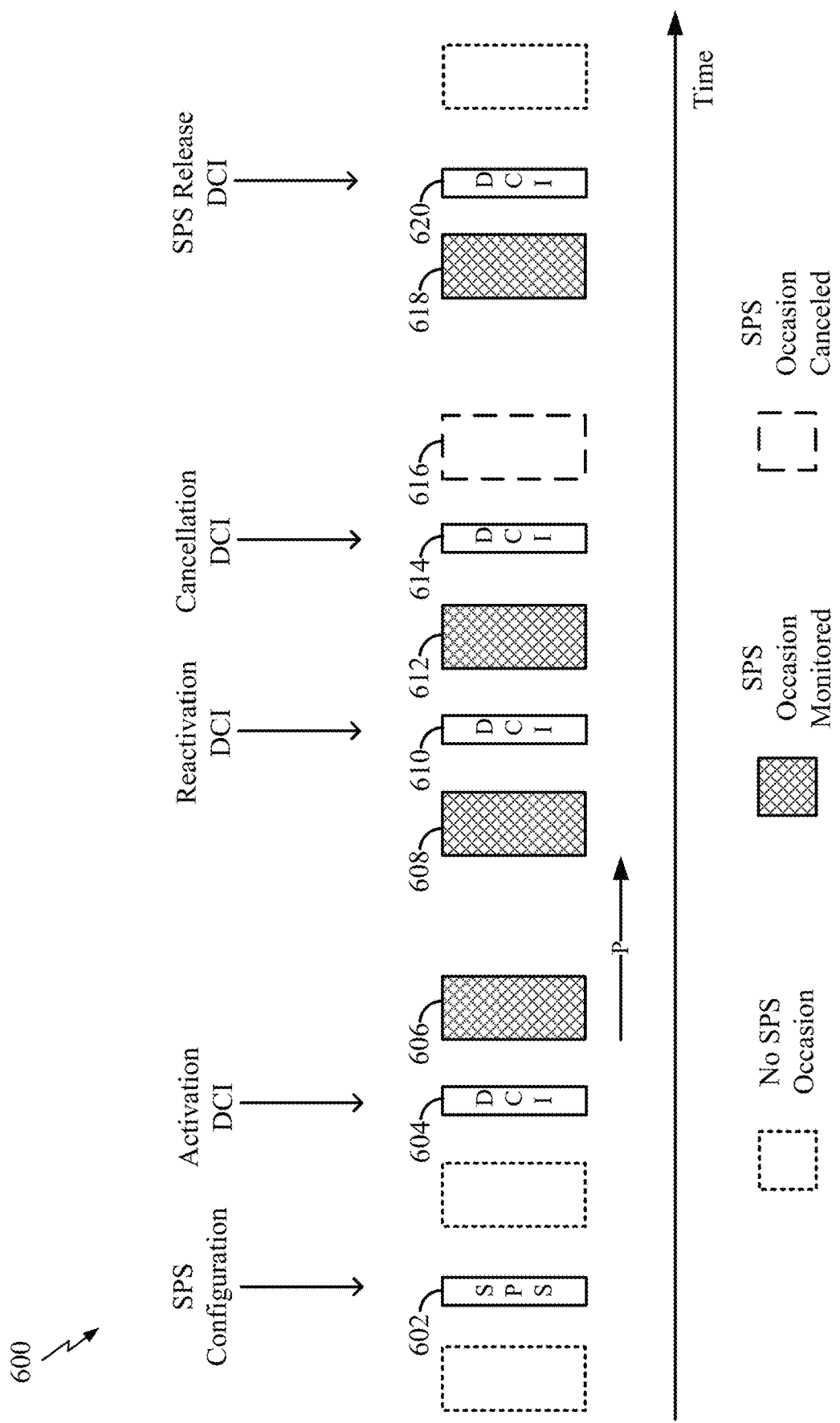
FIG. 6 is an example diagram illustrating an exemplary SPS configuration for wireless communication, with SPS cancellation DCI, according to some aspects.

FIG. 6 is an example diagram 600 illustrating an exemplary SPS configuration for wireless communication, with SPS cancellation DCI, according to some aspects. A base station 108 (e.g., scheduling entity 108) can transmit one or more SPS configurations to a UE (e.g., UE 106) using SPS signaling 602. Details of the SPS configurations and various types of DCI including activation DCI, reactivation DCI, and an SPS release DCI are omitted for brevity, as they are discussed above in reference to FIG. 5. After the SPS configuration(s) are configured, the base station can transmit activation DCI 604 (e.g., in a PDCCH) to activate the configured SPS configuration(s) at the UE. No SPS occasions may be monitored by the UE prior to receiving the activation DCI 604. The activation DCI 604 may activate at least one SPS configuration, e.g., by indicating the index of an SPS configuration that is activated.

In FIG. 6, after the activation DCI 604 activates a particular SPS configuration, the UE monitors SPS occasions such as SPS occasions 606 and 608, which have the periodicity P between successive SPS occasions. After the SPS occasion 608, the base station transmits reactivation DCI 610 to reactivate the configured SPS configuration(s) at the UE. In some examples, the reactivation DCI 610 may reactivate the configured SPS configuration by reconfiguring transmission parameters such as an MCS, resource allocations, antenna ports of an SPS transmission, a DMRS configuration, beamforming, precoding, etc. After receiving the reactivation DCI 610, the UE may monitor subsequent SPS occasions such as SPS occasions 612 and 618, according to the parameters indicated in the reactivation DCI 610. For example, the SPS occasions 612 and 618 may be monitored using the reconfigured transmission parameters according to the reactivation DCI 610.

In FIG. 6, after the SPS occasion 612, the base station transmits SPS cancellation DCI 614 to cancel one or more SPS occasions occurring after the SPS cancellation DCI 614 is received by the UE. The SPS cancellation DCI may indicate a number of SPS occasions to cancel. In the example shown in FIG. 6, the SPS cancellation DCI 614 indicates to cancels one subsequent SPS occasion, and thus the UE does not monitor an SPS occasion at an allocated portion 616 (e.g., configured by the reactivation DCI 610). After skipping the allocated portion 616 according to the SPS cancellation DCI 614, the UE may resume monitoring a subsequent SPS occasion such as an SPS occasion 618.

When the UE receives an SPS release DCI 620, the UE deactivates the configured SPS configuration. For example, when the UE receives the SPS release DCI 620, the UE stops monitoring subsequent SPS occasions.

In some aspects, when the UE receives DCI, the UE may determine whether the DCI is for SPS activation, SPS reactivation, or SPS release, or another type of DCI for dynamically rescheduling a PDSCH transmission. A two-step procedure may be implemented for the UE to validate that the DCI is for SPS and subsequently to determine a type of DCI for the SPS (e.g., by determining whether the DCI for SPS activation, SPS reactivation, or SPS release).

As a first step of the two-step procedure, the UE may validate that the DCI is for SPS if the following four conditions are satisfied, where the four conditions are that: (1) the CRC of a corresponding DCI format is scrambled with a CS-RNTI provided by a cs-RNTI field, (2) a new data indicator field in the DCI format for the enabled transport block is set to 0, (3) a downlink feedback information (DFI) flag field (if present) in the DCI format is set to 0, and (4) if validation is for scheduling activation and if the PDSCH-to-HARQ feedback timing indicator field in the DCI format is present, the PDSCH-to-HARQ feedback timing indicator field does not provide an inapplicable value from a dl-DataToUL-ACK field, where the dl-DataToUL-ACK field may include a list of timing for a given PDSCH to a DL ACK.

If the first step validates that the DCI is for SPS, the UE may perform a second step of the two-step procedure to determine a type of DCI for the SPS. In some aspects, if the UE detects all 0's in a redundancy version (RV) field within the DCI, the UE may determine that the DCI is for SPS activation or for SPS reactivation. Hence, to generate SPS activation DCI or SPS reactivation DCI, the base station may set the RV field of the DCI to include all 0's. For example, if the SPS configuration has not been activated and the RV field of the DCI includes all 0's, the UE may determine that the DCI is for SPS activation. For example, if the SPS configuration has been activated and the RV field of the DCI includes all 0's, the UE may determine that the DCI is for SPS reactivation. Table 1 below shows the condition for determining that the DCI is for SPS activation or for SPS reactivation.

TABLE 1

| Condition for SPS activation DCI or SPS reactivation DCI |  |
|---|---|
| Condition for SPS activation DCI or for SPS reactivation DCI | |
| Redundancy Version | All 0's |

In some aspects, the UE may determine that the DCI is for SPS release if the UE detects that the RV field includes all 0's, an MCS field includes all 1's, and that invalid frequency domain resource allocation (FDRA) value is used. In an aspect, the UE may determine that the invalid FDRA value is used if the FDRA value is set to all 0's for FDRA Type 0 or for dynamic switching between FDRA Type 0 and FDRA Type 1, or if the FDRA value is set to all 1's for FDRA Type 1. Otherwise, the UE may determine that the FDRA value is a valid value. Table 1 below shows the condition for determining that the DCI is for SPS release.

TABLE 2

| Condition for SPS release DCI Condition for SPS release DCI | |
|---|---|
| Redundancy Version | Set to all 0's |
| MCS | Set to all 1's |
| FDRA | Set to all 0's for FDRA Type 0 or for dynamic switching, OR Set to all 1's for FDRA Type 1 |

In the past, a procedure to determine that the DCI for SPS is for SPS cancellation has not been developed. Hence, according to some aspects of the disclosure, the UE may determine whether the DCI is for SPS cancellation based at least on the RV field in the DCI. In an aspect, the UE may determine whether the DCI is for SPS cancellation as a second step of the two-step procedure after performing the first step of validating that the DCI is for SPS. For example, the UE may determine that the DCI is for SPS cancellation based on particular values for one or more of the RV field, an MCS field, and a FDRA field. Hence, for example, one or more of the RV field, an MCS field, and a FDRA field may be reused to indicate the SPS cancellation for the DCI. The UE may be a UE or a scheduled entity as illustrated in any one or more of FIGS. 1, 2, and/or 3.

According to a first approach, the base station may set the RV field in the DCI to indicate SPS cancellation. The base station may be a base station or a scheduling entity as illustrated in any one or more of FIGS. 1, 2, and/or 3. In an aspect, to indicate the SPS cancellation, the RV field may be set to values other than all 0's. For example, to indicate the SPS cancellation, the RV field may be set to include one or more is (e.g., all 1's). When the UE determines that the DCI is for SPS and further determines that the RV field includes values other than all 0's (e.g., all values being 1's), then UE may determine that the DCI for SPS is SPS cancellation DCI. Table 3.1 below shows a condition including example values for the RV field to indicate the SPS cancellation, according to the first approach.

TABLE 3.1

| Condition for SPS cancellation DCI according to the first approach Condition for SPS cancellation DCI | |
|---|---|
| Redundancy Version | Set to all 1's |

Figure 7:
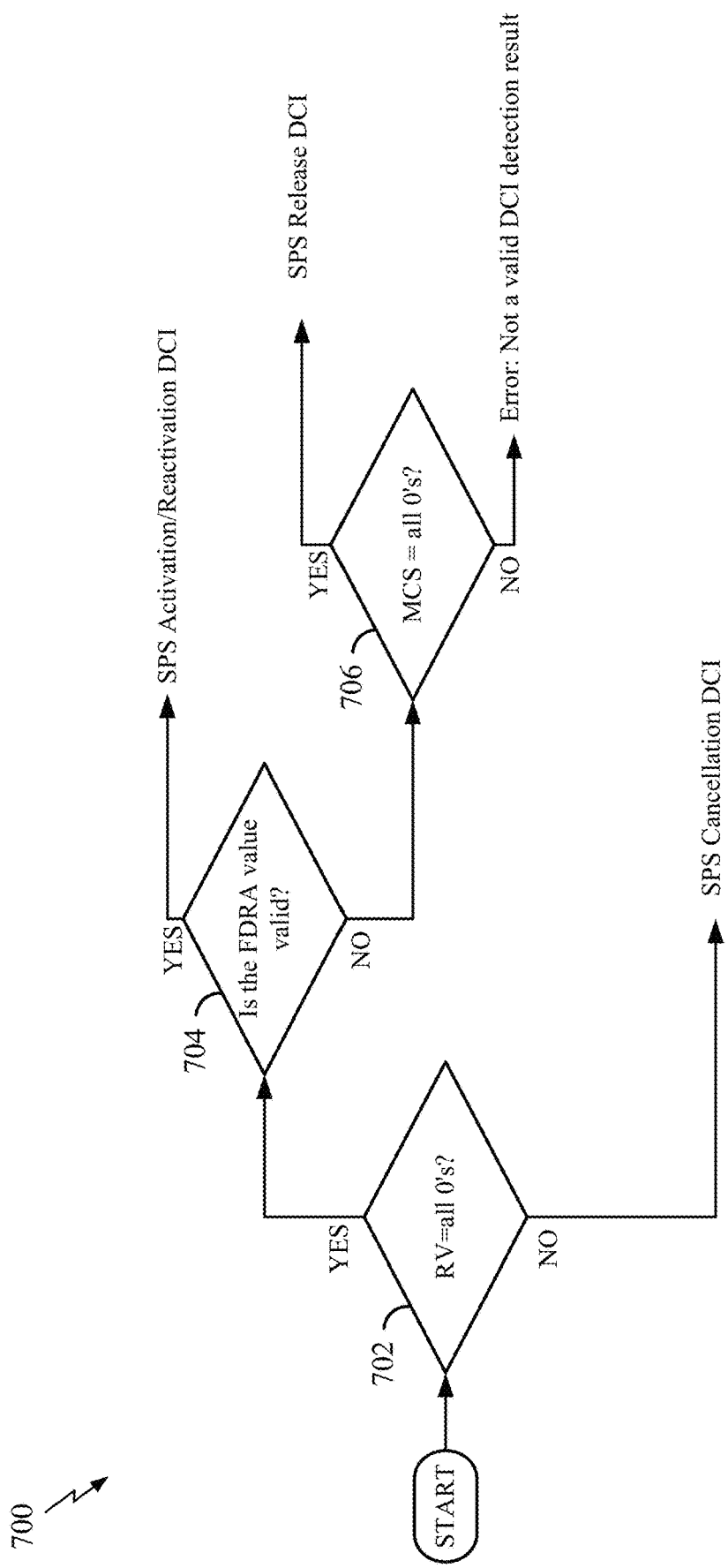
FIG. 7 is an example flow diagram illustrating determination of a type of DCI for SPS, according to some aspects.

FIG. 7 is an example flow diagram 700 illustrating determination of a type of DCI for SPS, according to some aspects. The features in the flow diagram 700 may be performed as a part of the second step of the two-step procedure that determines a type of DCI for SPS. Further, the features in the flow diagram 700 may be based on the condition provided in Table 3.1.

At 702, the UE may determine whether the RV field is set to all 0's. If the UE determines at 702 that the RV field is set to all 0's, the UE may determine at 704 whether the FDRA value is a valid value. For example, the UE may determine that the FDRA value is invalid if the FDRA value is set to all 0's for FDRA Type 0 or for dynamic switching between FDRA Type 0 and FDRA Type 1, or if the FDRA value is set to all 1's for FDRA Type 1. Otherwise, the UE may determine that the FDRA value is a valid value. If the UE at 704 determines that the FDRA value is a valid value, then the UE may determine that the DCI is for SPS activation or SPS reactivation. If the UE at 704 determines that the FDRA value is an invalid value, then the UE may determine at 706 whether the MCS field is set to all 0's. If the UE determines at 706 that the MCS field is set to all 0's, then the UE may determine that the DCI is for SPS release. If the UE determines at 706 that the MCS field is not set to all 0's, then the UE may determine that an error having an invalid DCI detection result has occurred.

In FIG. 7, if the UE determines at 702 that the RV field is not set to all 0's, the UE may determine that the DCI is for SPS cancellation.

According to a second approach, the base station may set the RV field and the MCS field in the DCI to indicate SPS cancellation. In an aspect, to indicate the SPS cancellation, the RV field may be set to values other than all 0's and the MCS set may be set to values other than all 1's. For example, to indicate the SPS cancellation, the RV field may be set to all 1's and the MCS set may be set to all 0's. When the UE determines that the DCI is for SPS and further determines that the RV field includes values other than all 0's (e.g., all values being 1's) and the MCS field includes values other than all 1's (e.g., all values being 0's), then UE may determine that the DCI for SPS is SPS cancellation DCI. Table 3.2 below shows a condition including example values for the RV field and the MCS field to indicate the SPS cancellation, according to the second approach.

TABLE 3.2

| Condition for SPS cancellation DCI according to the second approach Condition for SPS cancellation DCI | |
|---|---|
| Redundancy Version | Set to all 1's |
| MCS | Set to all 0's |

Figure 8:
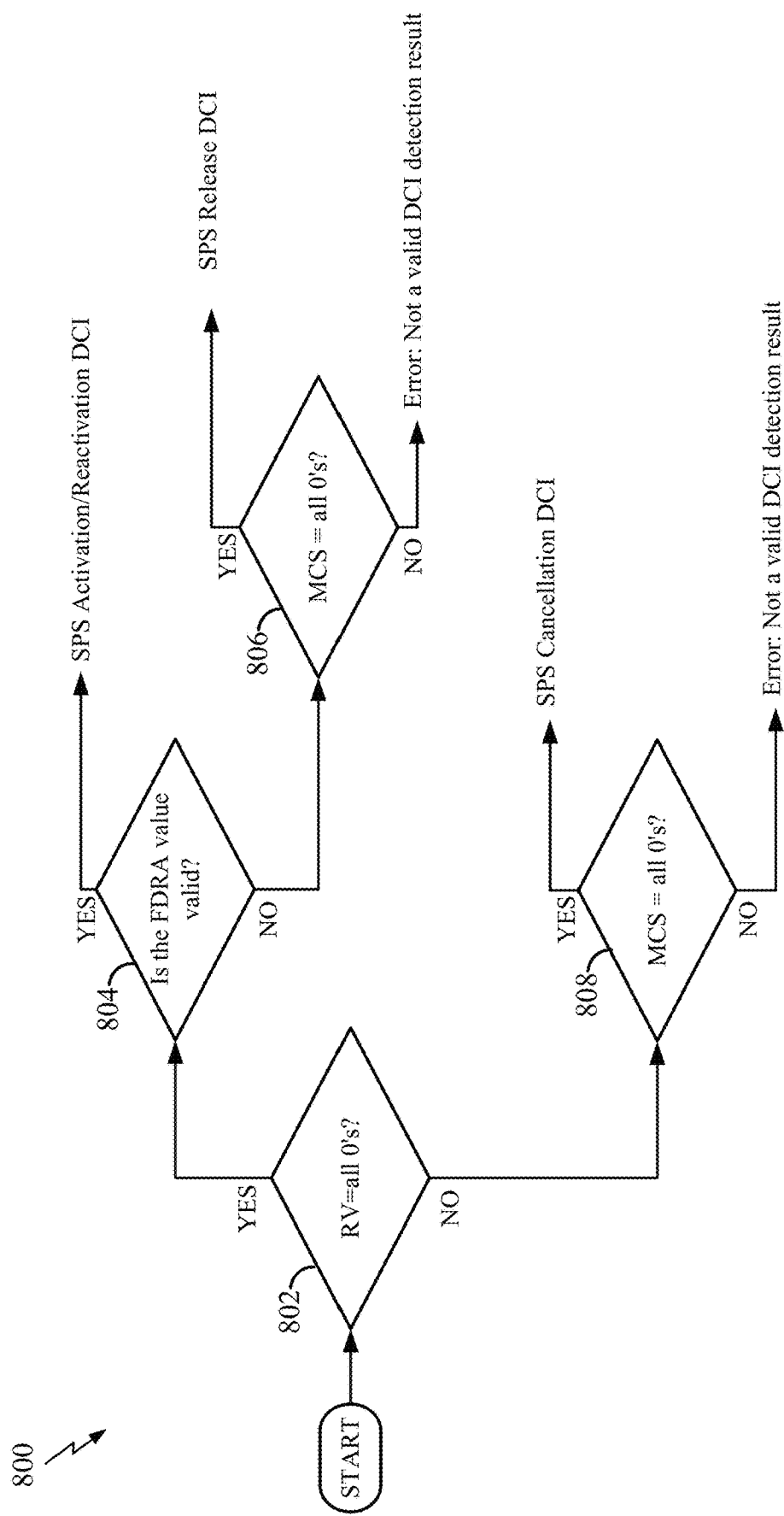
FIG. 8 is an example flow diagram illustrating determination of a type of DCI for SPS, according to some aspects.

FIG. 8 is an example flow diagram 800 illustrating determination of a type of DCI for SPS, according to some aspects. The features in the flow diagram 800 may be performed as a part of the second step of the two-step procedure that determines a type of DCI for SPS. Further, the features in the flow diagram 800 may be based on the condition provided in Table 3.2.

At 802, the UE may determine whether the RV field is set to all 0's. If the UE determines at 802 that the RV field is set to all 0's, the UE may determine at 804 whether the FDRA value is a valid value. For example, the UE may determine that the FDRA value is invalid if the FDRA value is set to all 0's for FDRA Type 0 or for dynamic switching between FDRA Type 0 and FDRA Type 1, or if the FDRA value is set to all 1's for FDRA Type 1. Otherwise, the UE may determine that the FDRA value is a valid value. If the UE at 804 determines that the FDRA value is a valid value, then the UE may determine that the DCI is for SPS activation or SPS reactivation. If the UE at 804 determines that the FDRA value is an invalid value, then the UE may determine at 806 whether the MCS field is set to all 0's. If the UE determines at 806 that the MCS field is set to all 0's, then the UE may determine that the DCI is for SPS release. If the UE determines at 806 that the MCS field is not set to all 0's, then the UE may determine that an error having an invalid DCI detection result has occurred.

If the UE determines at 802 that the RV field is not set to all 0's, the UE may determine at 808 whether the MCS field is set to all 0's. If the UE determines at 808 that the MCS field is set to all 0's, the UE may determine that the DCI is for SPS cancellation. If the UE determines at 808 that the MCS field is not set to all 0's, then the UE may determine that an error having an invalid DCI detection result has occurred.

According to a third approach, the base station may set the RV field, the MCS field, and the FDRS field in the DCI to indicate SPS cancellation. In an aspect, to indicate the SPS cancellation, the RV field may be set to values other than all 0's, the MCS set may be set to values other than all 1's, and the FDRS field may be set to an invalid value. For example, to indicate the SPS cancellation, the RV field may be set to all 1's, the MCS field may be set to all 0's, and the FDRA field may be set to all '0's for FDRA Type 0 or for dynamic switching between FDRA Type 0 and FDRA Type 1, or the FDRA value may be set to all 1's for FDRA Type 1. When the UE determines that the DCI is for SPS and further determines that the RV field includes values other than all 0's (e.g., all values being 1's), the MCS field includes values other than all 1's (e.g., all values being 0's), and the FDRS field is set to an invalid value, then UE may determine that the DCI for SPS is SPS cancellation DCI. Table 3.3 below shows a condition including example values for the RV field and the MCS field to indicate the SPS cancellation, according to the third approach.

TABLE 3.3

Condition for SPS cancellation DCI according to the third approach
Condition for SPS cancellation DCI

| | |
|---|---|
| Redundancy Version | Set to all 1's |
| MCS | Set to all 0's |
| FDRA | Set to all 0's for FDRA Type 0 or for dynamic switching, OR Set to all 1's for FDRA Type 1 |

Figure 9:
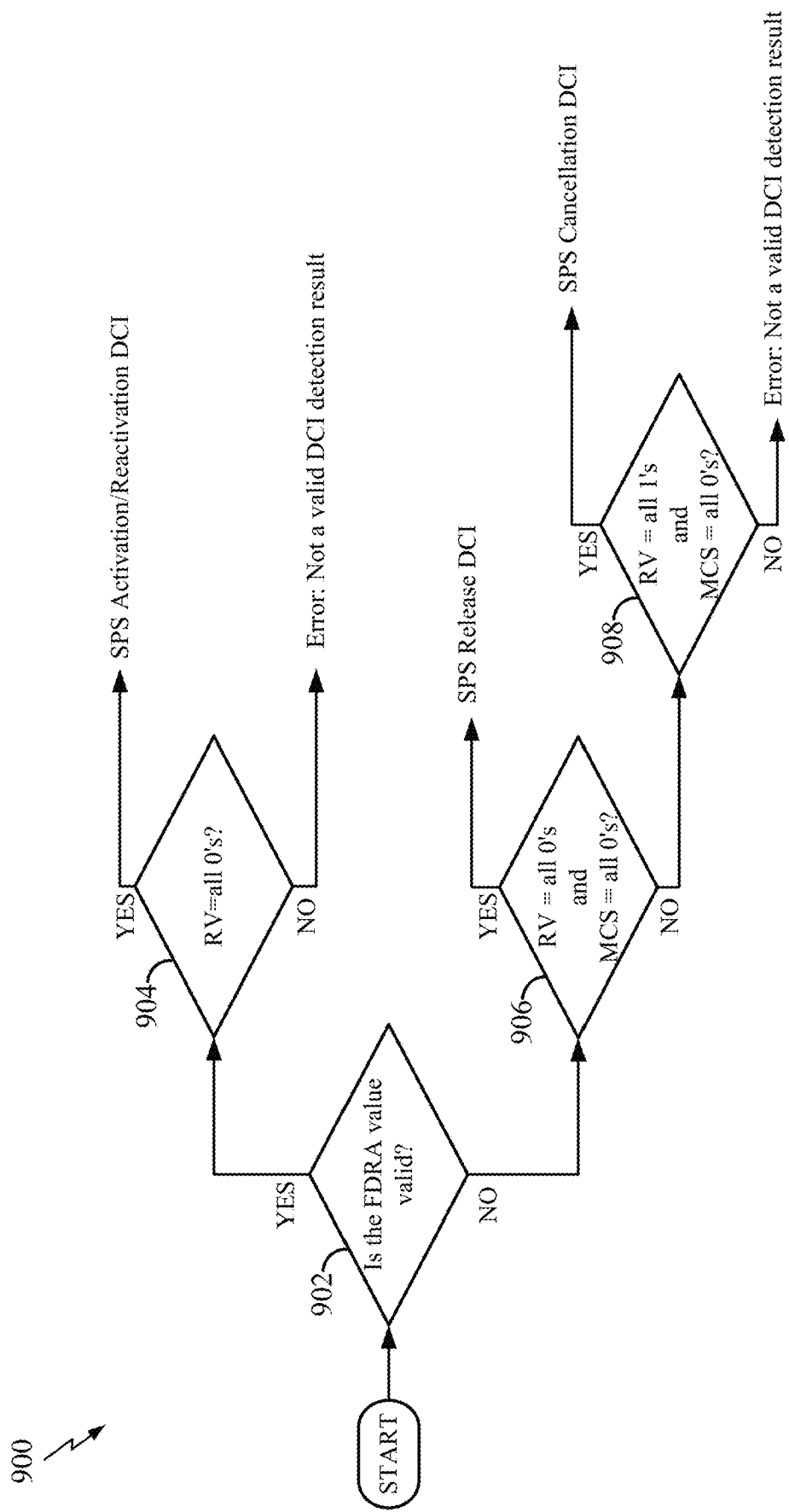
FIG. 9 is an example flow diagram illustrating determination of a type of DCI for SPS, according to some aspects.

FIG. 9 is an example flow diagram 900 illustrating determination of a type of DCI for SPS, according to some aspects. The features in the flow diagram 900 may be performed as a part of the second step of the two-step procedure that determines a type of DCI for SPS. Further, the features in the flow diagram 900 may be based on the condition provided in Table 3.3.

At 902, the UE may determine whether the FDRA value is a valid value. For example, the UE may determine that the FDRA value is invalid if the FDRA value is set to all 0's for FDRA Type 0 or for dynamic switching between FDRA Type 0 and FDRA Type 1, or if the FDRA value is set to all 1's for FDRA Type 1. Otherwise, the UE may determine that the FDRA value is a valid value. If the UE at 902 determines that the FDRA value is a valid value, then the UE may determine at 904 whether the RV field is set to all 0's. If the RV field is set to all 0's, then the UE may determine that the DCI is for SPS activation or for SPS reactivation. If the RV field is not set to all 0's, then the UE may determine that an error having an invalid DCI detection result has occurred.

If the UE at 902 determines that the FDRA value is invalid, then the UE may determine at 906 whether the RV field is set to all 0's and the MCS field is set to all 0's. If the RV field is set to all 0's and the MCS field is set to all 0's, the UE may determine that the DCI is for SPS release.

If the RV field is not set to all 0's and/or the MCS field is not set to all 0's, the UE may determine at 908 whether the RV field is set to all 1's and the MCS field is set to all 0's. At 908, if the RV field is set to all 1's and the MCS field is set to all 0's, then the UE may determine that the DCI is for SPS cancellation. At 908, if the RV field is not set to all 1's and/or the MCS field is not set to all 0's, then the UE may determine that an error having an invalid DCI detection result has occurred.

Figure 10:
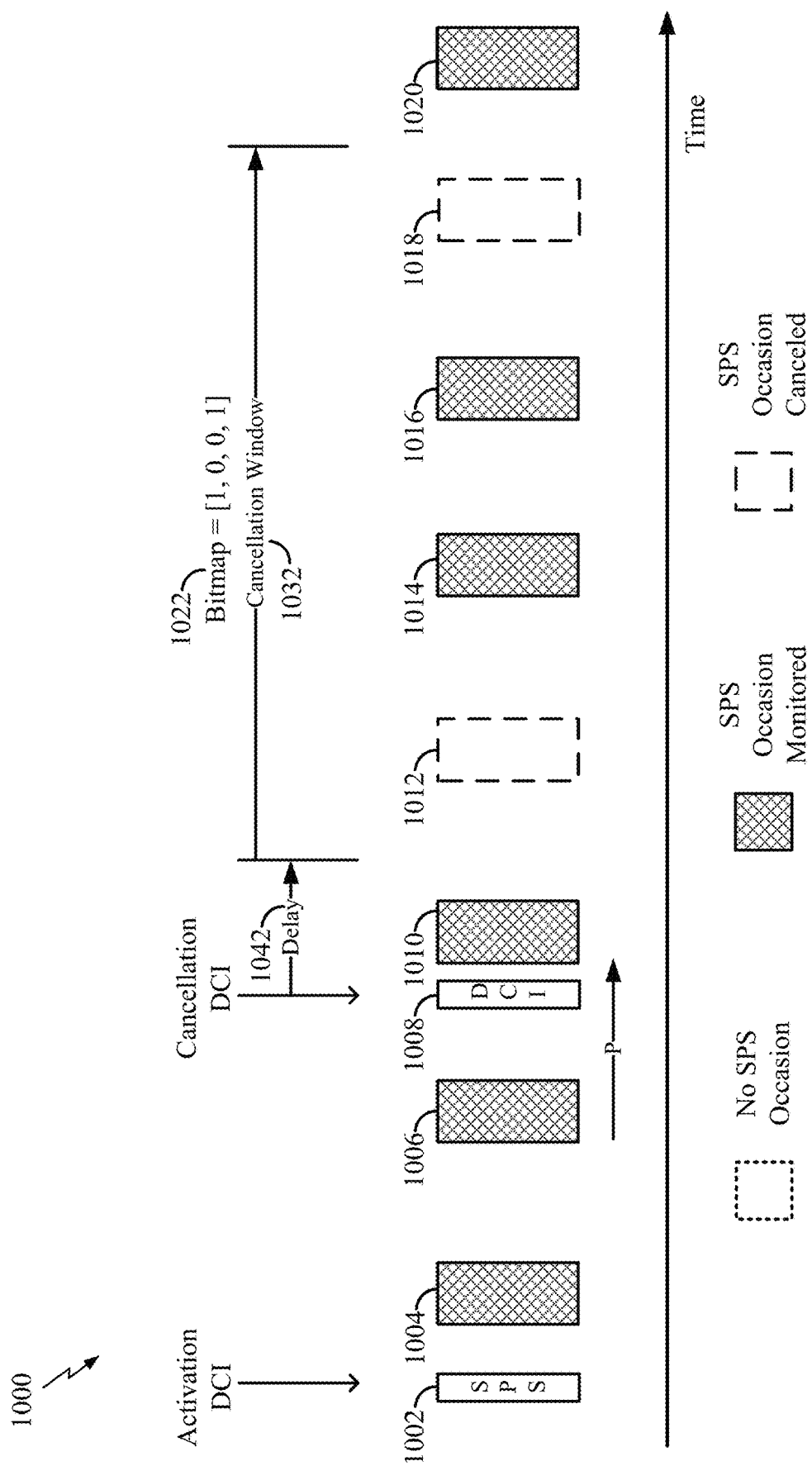
FIG. 10 is an example diagram illustrating a bitmap for SPS cancellation in SPS cancellation DCI, according to some aspects.

According to some aspects, the UE may further check a bitmap to determine which SPS occasion the SPS cancellation DCI indicates to cancel, e.g., after validating the DCI to be a valid SPS cancellation DCI. In an aspect, the SPS cancellation DCI may include a bitmap with X number of bits, where X is an integer. The value of X may be configured via an RRC message. A value of the x-th bit in the bitmap may indicate whether the x-th SPS occasion in the cancellation window is canceled. The value of the x-th bit being 1 may indicate that the x-th SPS occasion in the cancellation window is canceled, and the value of the x-th bit being 0 may indicate that the x-th SPS occasion in the cancellation window is not canceled. In an aspect, the length of the cancellation window may be implicitly derived based on the number of bits in the bitmap in the SPS cancellation DCI. For example, if the bitmap has X bits, the UE may determine that the length of cancelation window covers X SPS occasions FIG. 10 is an example diagram 1000 illustrating a bitmap for SPS cancellation in SPS cancellation DCI, according to some aspects. Details of the SPS configurations and various types of DCI including activation DCI, reactivation DCI, and SPS release DCI are omitted for brevity, as they are discussed above in reference to FIG. 5. After the SPS configuration(s) are configured, the base station can transmit activation DCI 1002 (e.g., in a PDCCH) to activate the configured SPS configuration(s) at the UE. No SPS occasions may be monitored by the UE prior to receiving the activation DCI 1002. The activation DCI 1002 may activate at least one SPS configuration, e.g., by indicating an index of an SPS configuration to be activated.

In FIG. 10, after the activation DCI 1002 activates a particular SPS configuration, the UE monitors SPS occasions such as SPS occasions 1004, 1006, and 1010, which have the periodicity P (e.g., according to the particular SPS configuration). After the SPS occasion 1006, in FIG. 10, the base station transmits SPS cancellation DCI 1008 to cancel one or more SPS occasions following after the SPS cancellation DCI 1008 is received by the UE. The SPS cancellation DCI may indicate a number of SPS occasions to cancel. In FIG. 10, the SPS cancellation DCI 614 indicates to cancels four subsequent SPS occasions, which may be indicated by an SPS cancellation window 1032 (e.g., in time) in the SPS cancellation DCI 614. The SPS cancellation window 1032 may start with a delay 1042 after receiving the SPS cancellation DCI 1008. The value of the delay 1042 may be configured by network via an RRC configuration or may be indicated in the SPS cancellation DCI 1008. The length of the SPS cancellation window 1032 may be implicitly derived based on the number of bits in the bitmap in the SPS cancellation DCI 1008. For example, because the bitmap 1022 has 4 bits, the UE may determine that the length of cancelation window is 4 SPS occasions.

In FIG. 10, the number X of bits in the bitmap is 4, and thus the SPS cancellation window 1032 covers four subsequent SPS occasions at 1012, 1014, 1016, and 1018. The bitmap 1022 in FIG. 10 includes four bits that respectively indicate four values including 1, 0, 0, and 1. Therefore, based on the first bit value and the fourth bit value being 1 in the bitmap 1022, the UE cancels the first and the fourth SPS occasions in the SPS cancellation window 1032, at 1012 and 1018 respectively. Further, based on the second bit value and the third bit value being 0 in the bitmap 1022, The UE monitors the second and third SPS occasions in the SPS cancellation window 1032, at 1014 and 1016 respectively. After the SPS cancellation window 1032 ends, the UE may resume monitoring a subsequent SPS occasion such as an SPS occasion 1020.

In some aspects, the base station may include the bitmap for the SPS cancellation in a cancellation bitmap field defined in SPS cancellation DCI. The cancellation bitmap field may be a newly added field in the SPS cancellation DCI. In an aspect, the SPS cancellation DCI with the cancellation bitmap field may be DL DCI format 1_0, 1_1, or 1_2.

In some aspects, instead of adding a new field, already-existing field(s) in the DCI may be used to include the bitmap for the SPS cancellation. For example, because the SPS cancellation DCI may not carry DL data scheduling information, one or more fields in the SPS cancellation DCI may not be used and thus may instead be use to indicate the bitmap. In an aspect, the base station may indicate the bitmap in one or more fields in the SPS cancellation DCI that are respectively associated with antenna ports, a DMRS, an initial seed, an MCS, and an FDRA. For example, in the first approach, one or more fields respectively associated with antenna ports, a DMRS, an initial seed, an MCS, and an FDRA may be used to indicate the bitmap but the RV field may not be used to indicate the bitmap, because only the RV field is used to indicate the SPS cancellation DCI. In another example, in the second approach, one or more fields respectively associated with antenna ports, a DMRS, an initial seed, and an FDRA may be used to indicate the bitmap but the RV field and the MCS field may not be used to indicate the bitmap, because the RV field and the MCS field are used to indicate the SPS cancellation DCI. In another example, in the third approach, one or more fields respectively associated with antenna ports, a DMRS, and an initial seed may be used to indicate the bitmap but the RV field, the MCS field, and the FDRA field may not be used to indicate the bitmap, because the RV field, the MCS field, and the FDRA field are used to indicate the SPS cancellation DCI.

Figure 11:
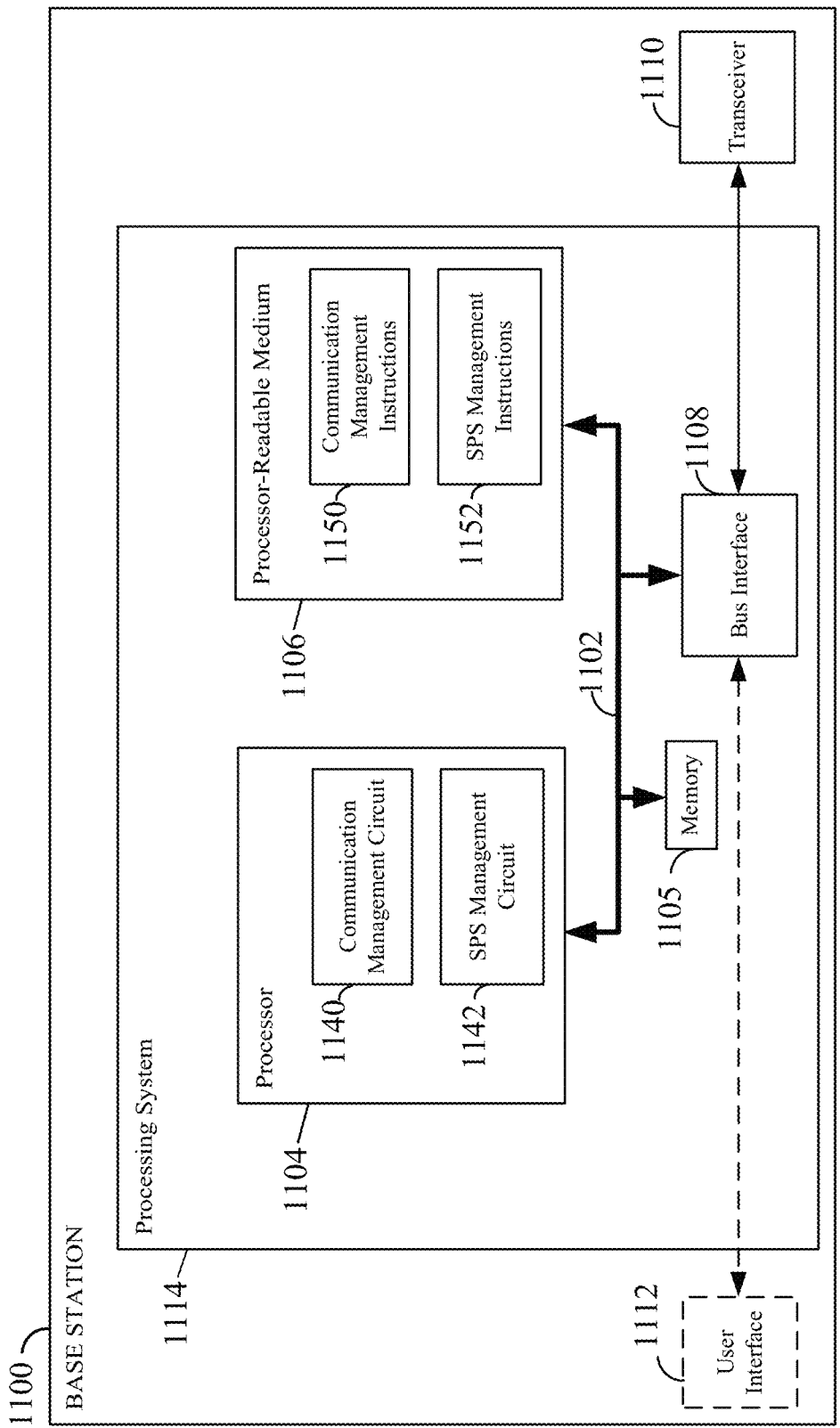
FIG. 11 is a block diagram conceptually illustrating an example of a hardware implementation for a base station according to some aspects of the disclosure.

FIG. 11 is a block diagram illustrating an example of a hardware implementation for a base station 1100 employing a processing system 1114. For example, the base station 1100 may be a base station or a scheduling entity as illustrated in any one or more of FIGS. 1, 2, and/or 3.

The base station 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1100 may be configured to perform any one or more of the functions described herein. That is, the processor 1104, as utilized in a base station 1100, may be used to implement any one or more of the processes and procedures described below and illustrated in FIGS. 5-10 and 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and processor-readable media (represented generally by the processor-readable storage medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects, the processor 1104 may include a communication management circuitry 1140 that can be configured to perform various functions, including, for example, transmitting, to a UE, first DCI to trigger an SPS configuration of a plurality of SPS occasions. For example, the communication management circuitry 1140 may be configured to implement one or more of the functions described below in relation to FIG. 12, including, e.g., block 1202.

In some aspects, the communication management circuitry 1140 can be configured to perform various functions, including, for example, transmitting second DCI to trigger an SPS cancellation that cancels the one or more SPS occasions, the second DCI including at least a redundancy version field including one or more redundancy version values to indicate the SPS cancellation. For example, the communication management circuitry 1140 may be configured to implement one or more of the functions described below in relation to FIG. 12, including, e.g., block 1210.

In some aspects, the communication management circuitry 1140 can be configured to perform various functions, including, for example, transmitting an SPS cancellation delay value to the UE to indicate a delay to cancel the one or more SPS occasions after the second DCI is received by the UE. For example, the communication management circuitry 1140 may be configured to implement one or more of the functions described below in relation to FIG. 12, including, e.g., block 1208.

In some aspects, the processor 1104 may include an SPS management circuitry 1142 that can be configured to perform various functions, including, for example, determining to cancel one or more SPS occasions of the plurality of SPS occasions. For example, the SPS management circuitry 1142 may be configured to implement one or more of the functions described below in relation to FIG. 12, including, e.g., block 1206.

In some aspects, the SPS management circuitry 1142 can be configured to perform various functions, including, for example, determining an absence of downlink data to transmit to the UE. For example, the SPS management circuitry 1142 may be configured to implement one or more of the functions described below in relation to FIG. 12, including, e.g., block 1204.

The processor 1104 is responsible for managing the bus 1102 and general processing, including the execution of software stored on the processor-readable storage medium 1106. The software, when executed by the processor 1104, causes the processing system 1114 to perform the various functions described below for any particular apparatus. The processor-readable storage medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1106. The processor-readable storage medium 1106 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1106 may reside in the processing system 1114, external to the processing system 1114, or distributed across multiple entities including the processing system 1114. The processor-readable storage medium 1106 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In one or more examples, the processor-readable storage medium 1106 may include a communication management software/instructions 1150 that can be configured to perform various functions, including, for example, transmitting, to a UE, first DCI to trigger an SPS configuration of a plurality of SPS occasions. For example, the communication management software/instructions 1150 may be configured to implement one or more of the functions described below in relation to FIG. 12, including, e.g., block 1202.

In some aspects, the communication management software/instructions 1150 can be configured to perform various functions, including, for example, transmitting second DCI to trigger an SPS cancellation that cancels the one or more SPS occasions, the second DCI including at least a redundancy version field including one or more redundancy version values to indicate the SPS cancellation. For example, the communication management software/instructions 1150 may be configured to implement one or more of the functions described below in relation to FIG. 12, including, e.g., block 1210.

In some aspects, the communication management software/instructions 1150 can be configured to perform various functions, including, for example, transmitting an SPS cancellation delay value to the UE to indicate a delay to cancel the one or more SPS occasions after the second DCI is received by the UE. For example, the communication management software/instructions 1150 may be configured to implement one or more of the functions described below in relation to FIG. 12, including, e.g., block 1208.

In some aspects, the processor-readable storage medium 1106 may include an SPS management software/instructions 1152 that can be configured to perform various functions, including, for example, determining to cancel one or more SPS occasions of the plurality of SPS occasions. For example, the SPS management software/instructions 1152 may be configured to implement one or more of the functions described below in relation to FIG. 12, including, e.g., block 1206.

In some aspects, the SPS management software/instructions 1152 can be configured to perform various functions, including, for example, determining an absence of downlink data to transmit to the UE. For example, the SPS management software/instructions 1152 may be configured to implement one or more of the functions described below in relation to FIG. 12, including, e.g., block 1204.

Figure 12:
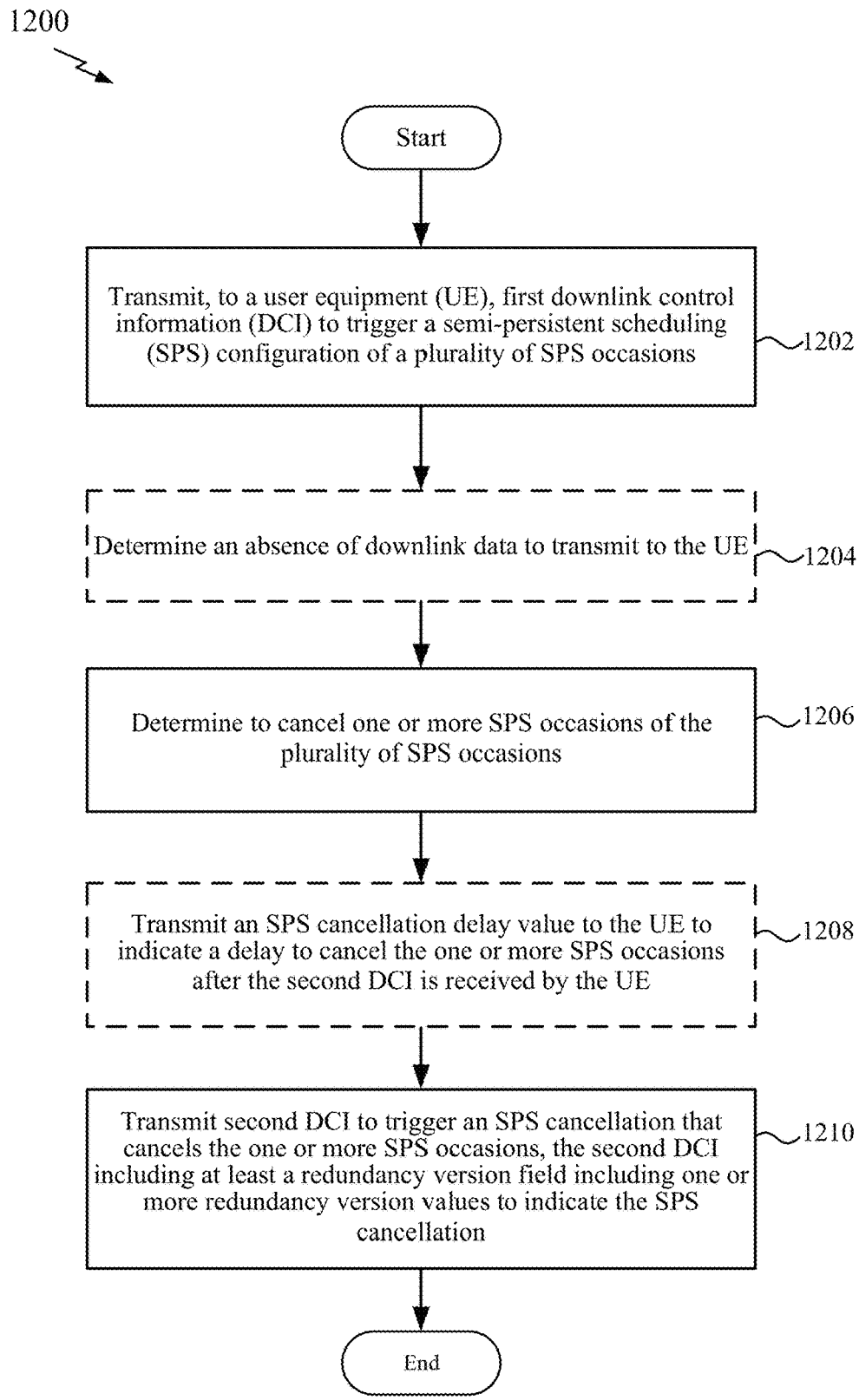
FIG. 12 is a flow chart illustrating an exemplary process for wireless communication at a base station using an SPS configuration according to some aspects.

FIG. 12 is a flow chart illustrating an exemplary process 1200 for wireless communication using an SPS configuration in accordance with some aspects. As described below, some or all illustrated features may be omitted in a particular implementation within the scope of the present disclosure, and some illustrated features may not be required for implementation of all embodiments. In some examples, the process 1200 may be carried out by the base station 1100 illustrated in FIG. 11. In some examples, the process 1200 may be carried out by any suitable apparatus or means for carrying out the functions or algorithm described below.

At block 1202, the base station may transmit, to a UE, first DCI to trigger an SPS configuration of a plurality of SPS occasions. In one aspect, the communication management circuitry 1140 may provide the means for transmitting the first DCI via the transceiver 1110.

In an aspect, at block 1204, the base station may determine an absence of downlink data to transmit to the UE. In one aspect, the SPS management circuitry 1142 may provide the means for determining the absence of downlink data.

At block 1206, the base station may determine to cancel one or more SPS occasions of the plurality of SPS occasions. In one aspect, the SPS management circuitry 1142 may provide the means for determining to cancel the one or more SPS occasions.

In an aspect, at block 1208, the base station may transmit an SPS cancellation delay value to the UE to indicate a delay to cancel the one or more SPS occasions after the second DCI is received by the UE. In one aspect, the communication management circuitry 1140 may provide the means for transmitting the SPS cancellation delay value.

At block 1210, the base station may transmit second DCI to trigger an SPS cancellation that cancels the one or more SPS occasions, the second DCI including at least a redundancy version field including one or more redundancy version values to indicate the SPS cancellation. In one aspect, the communication management circuitry 1140 may provide the means for transmitting the second DCI via the transceiver 1110.

In an aspect, the SPS cancellation delay value may be indicated via at least one of an RRC configuration or the second DCI.

In an aspect, at least one of the one or more redundancy version values is one.

In an aspect, the second DCI further comprises an SPS cancellation bitmap field including one or more bitmap values indicating the one or more SPS occasions for the SPS cancellation. In an aspect, a number of the one or more bitmap values in the cancellation bitmap field is associated with an SPS cancellation window indicating a time window to cancel the one or more SPS occasions.

In an aspect, the second DCI further comprises an antenna port field, a DMRS field, an initial seed field, an MCS field and an FDRA field, and at least one of the antenna port field, the DMRS field, the initial seed field, the MCS field, the FDRA field includes one or more bitmap values indicating the one or more SPS occasions for the SPS cancellation.

In an aspect, the second DCI further includes an MCS field including one or more MCS values, and the one or more redundancy version values and the one or more MCS values are included in the second DCI to indicate the SPS cancellation. In an aspect, at least one of the one or more redundancy version values is one, and at least one of the one or more MCS values is zero. In an aspect, the second DCI further comprises an antenna port field, a DMRS field, an initial seed field, and an FDRA field, and at least one of the antenna port field, the DMRS field, the initial seed field, the FDRA field includes one or more bitmap values indicating the one or more SPS occasions for the SPS cancellation.

In an aspect, the second DCI further includes an MCS field including one or more MCS values and an FDRA field including a plurality of FDRA values, and the one or more redundancy version values, the one or more MCS values, and the plurality of FDRA values are included in the second DCI to indicate the SPS cancellation. In an aspect, at least one of the one or more redundancy version values is one, and at least one of the one or more MCS values is zero, and the plurality of FDRA values are zero for a first FDRA type or a dynamic switch mode or the plurality of FDRA values are one for a second FDRA type. In an aspect, the second DCI further comprises an antenna port field, a DMRS field, and an initial seed field, and at least one of the antenna port field, the DMRS field, or the initial seed field includes one or more bitmap values indicating the one or more SPS occasions for the SPS cancellation.

In one configuration, the base station 1100 for wireless communication includes means for transmitting, to a UE, first DCI to trigger a SPS configuration of a plurality of SPS occasions, means for determining to cancel one or more SPS occasions of the plurality of SPS occasions, and means for transmitting second DCI to trigger an SPS cancellation that cancels the one or more SPS occasions, the second DCI including at least a redundancy version field including one or more redundancy version values to indicate the SPS cancellation. In an aspect, the base station 1100 may further include means for determining an absence of downlink data to transmit to the UE. In one aspect, the aforementioned means may be the processor(s) 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the processor-readable storage medium 1106, or any other suitable apparatus or means described in any one of the FIGS. 1, 2, and/or 3, and utilizing, for example, the processes and/or algorithms described herein in relation to FIG. 12.

Figure 13:
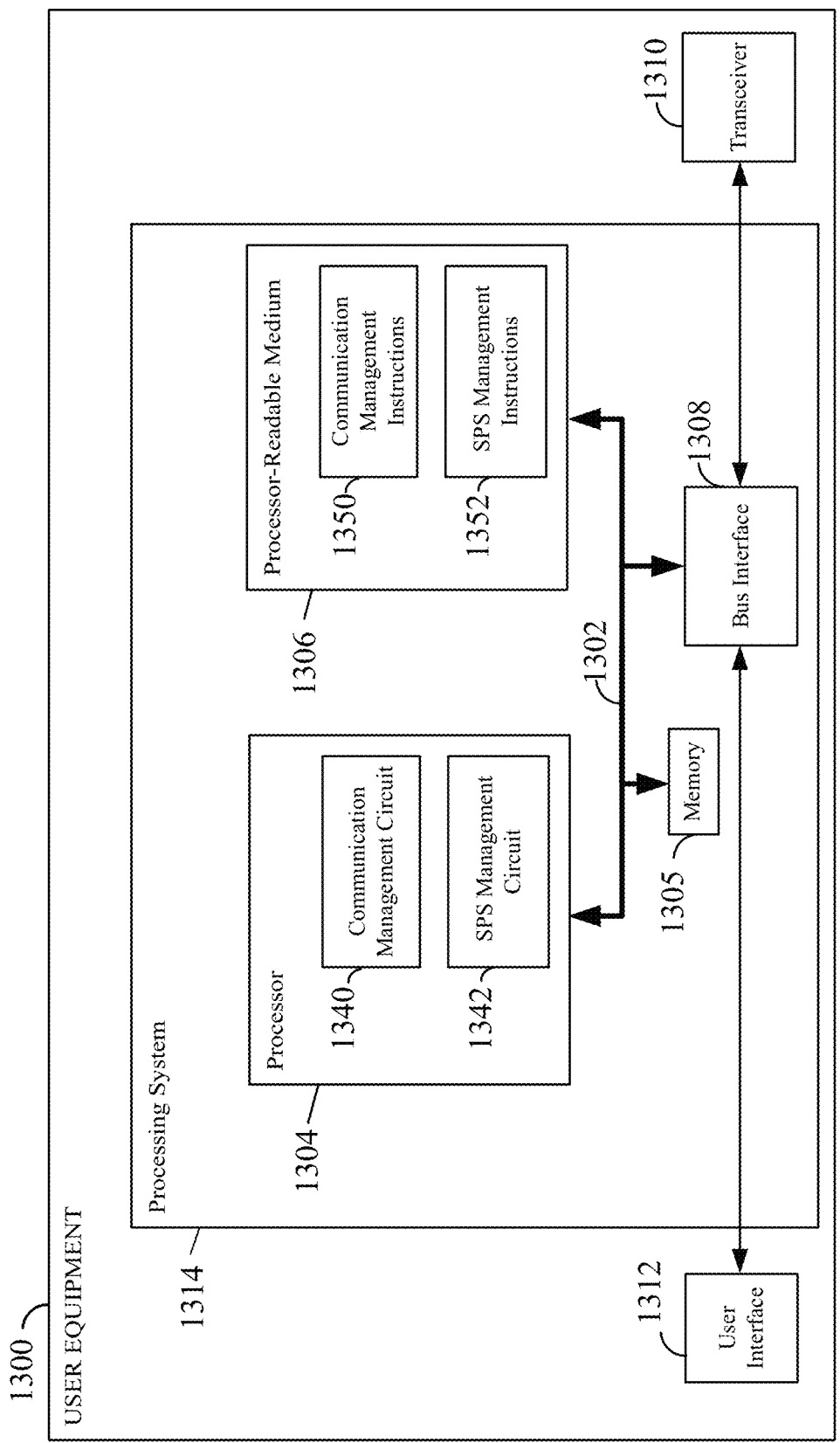
FIG. 13 is a block diagram conceptually illustrating an example of a hardware implementation for a user equipment according to some aspects of the disclosure.

FIG. 13 is a conceptual diagram illustrating an example of a hardware implementation for an exemplary UE 1300 employing a processing system 1314. In accordance with various aspects of the disclosure, an element, or any portion of an element, or any combination of elements may be implemented with a processing system 1314 that includes one or more processors 1304. For example, the UE 1300 may be a user equipment (UE) or a scheduled entity as illustrated in any one or more of FIGS. 1, 2, and/or 3.

The processing system 1314 may be substantially the same as the processing system 1114 illustrated in FIG. 11, including a bus interface 1308, a bus 1302, memory 1305, a processor 1304, and a processor-readable storage medium 1306. Furthermore, the UE 1300 may include a user interface 1312 and a transceiver 1310 substantially similar to those described above in FIG. 11. That is, the processor 1304, as utilized in a UE 1300, may be used to implement any one or more of the processes described and illustrated in relation to FIGS. 5-10 and 14.

In some aspects, the processor 1304 may include a communication management circuitry 1340 that can be configured to perform various functions, including, for example, receiving first DCI to trigger an SPS configuration of a plurality of SPS occasions. For example, the communication management circuitry 1340 may be configured to implement one or more of the functions described below in relation to FIG. 14, including, e.g., block 1402.

In some aspects, the communication management circuitry 1340 can be configured to perform various functions, including, for example, receiving an SPS cancellation delay value indicating a delay to cancel the one or more SPS occasions after the second DCI is received by the UE. For example, the communication management circuitry 1340 may be configured to implement one or more of the functions described below in relation to FIG. 14, including, e.g., block 1404.

In some aspects, the communication management circuitry 1340 can be configured to perform various functions, including, for example, receiving second DCI including at least a redundancy version field including one or more redundancy version values. For example, the communication management circuitry 1340 may be configured to implement one or more of the functions described below in relation to FIG. 14, including, e.g., block 1406.

In some aspects, the processor 1304 may include an SPS management circuitry 1342 that can be configured to perform various functions, including, for example, determining whether the second DCI indicates SPS cancellation that cancels one or more SPS occasions of the plurality of SPS occasions based at least on the one or more redundancy version values. For example, the SPS management circuitry 1342 may be configured to implement one or more of the functions described below in relation to FIG. 14, including, e.g., block 1408.

In some aspects, the SPS management circuitry 1342 can be configured to perform various functions, including, for example, determining an SPS cancellation window based on a number of the one or more bitmap values in the cancellation bitmap field, the SPS cancellation window indicating a time window to cancel the one or more SPS occasion. For example, the SPS management circuitry 1342 may be configured to implement one or more of the functions described below in relation to FIG. 14, including, e.g., block 1410.

In some aspects, the SPS management circuitry 1342 can be configured to perform various functions, including, for example, refraining from monitoring the one or more SPS occasions based on determining that the second DCI indicates the SPS cancellation. For example, the SPS management circuitry 1342 may be configured to implement one or more of the functions described below in relation to FIG. 14, including, e.g., block 1412.

In one or more examples, the processor-readable storage medium 1306 may include a communication management software/instructions 1350 that can be configured to perform various functions, including, for example, receiving first DCI to trigger an SPS configuration of a plurality of SPS occasions. For example, the communication management software/instructions 1350 may be configured to implement one or more of the functions described below in relation to FIG. 14, including, e.g., block 1402.

In some aspects, the communication management software/instructions 1350 can be configured to perform various functions, including, for example, receiving an SPS cancellation delay value indicating a delay to cancel the one or more SPS occasions after the second DCI is received by the UE. For example, the communication management software/instructions 1350 may be configured to implement one or more of the functions described below in relation to FIG. 14, including, e.g., block 1404.

In one or more examples, the communication management software/instructions 1350 can be configured to perform various functions, including, for example, receiving second DCI including at least a redundancy version field including one or more redundancy version values. For example, the communication management software/instructions 1350 may be configured to implement one or more of the functions described below in relation to FIG. 14, including, e.g., block 1406. In one or more examples, the processor-readable storage medium 1306 may include an SPS management software/instructions 1352 that can be configured to perform various functions, including, for example, determining whether the second DCI indicates SPS cancellation that cancels one or more SPS occasions of the plurality of SPS occasions based at least on the one or more redundancy version values. For example, the SPS management software/instructions 1352 may be configured to implement one or more of the functions described below in relation to FIG. 14, including, e.g., block 1408.

In some aspects, the SPS management software/instructions 1352 can be configured to perform various functions, including, for example, determining an SPS cancellation window based on a number of the one or more bitmap values in the cancellation bitmap field, the SPS cancellation window indicating a time window to cancel the one or more SPS occasion. For example, the SPS management software/instructions 1352 may be configured to implement one or more of the functions described below in relation to FIG. 14, including, e.g., block 1410.

In one or more examples, the SPS management software/instructions 1352 can be configured to perform various functions, including, for example, refraining from monitoring the one or more SPS occasions based on determining that the second DCI indicates the SPS cancellation. For example, the SPS management software/instructions 1352 may be configured to implement one or more of the functions described below in relation to FIG. 14, including, e.g., block 1412.

Figure 14:
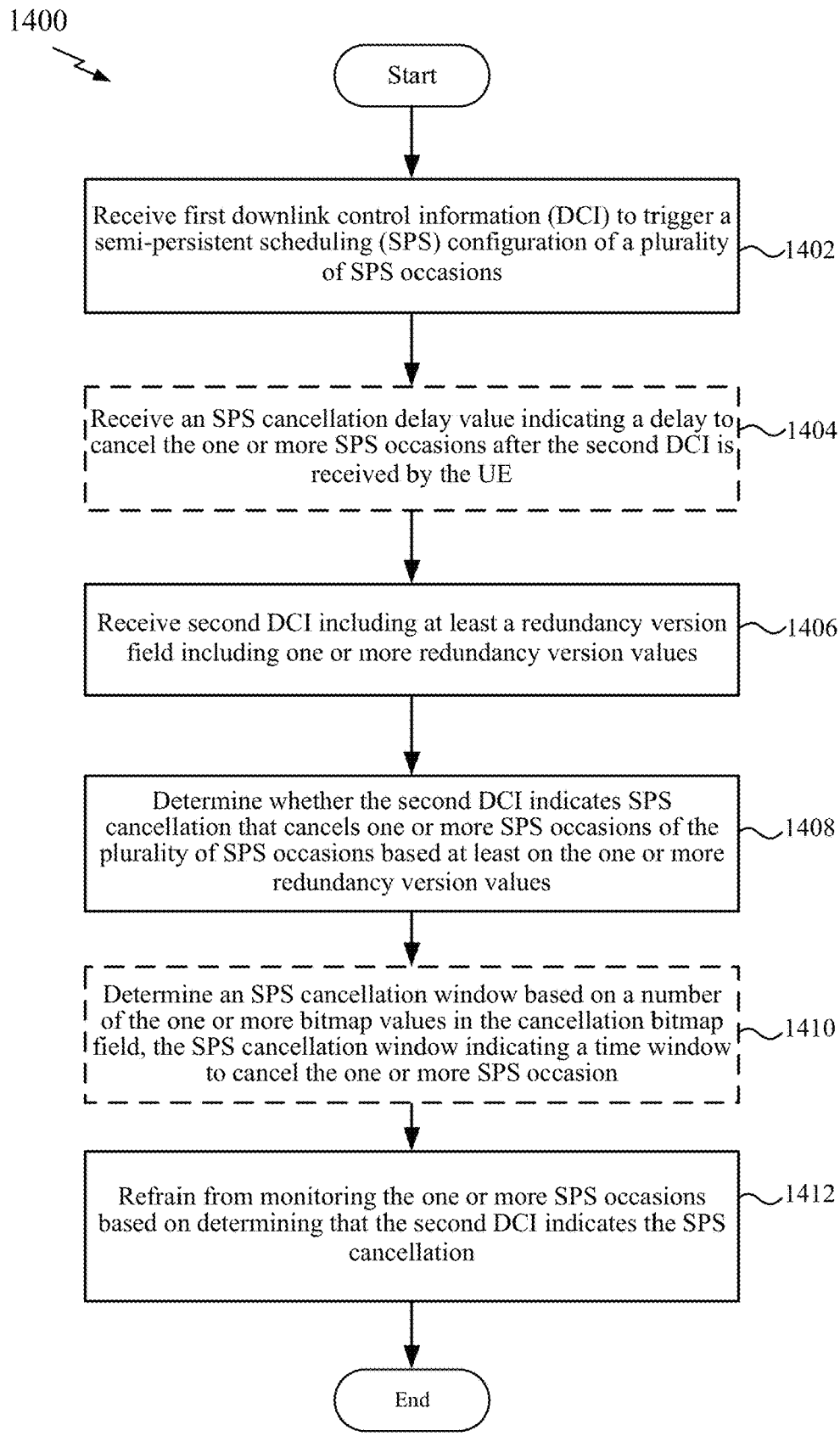
FIG. 14 is a flow chart illustrating an exemplary process for wireless communication at a user equipment using an SPS configuration according to some aspects.

FIG. 14 is a flow chart illustrating an exemplary process 1400 for wireless communication using SPS in accordance with some aspects. As described below, some or all illustrated features may be omitted in a particular implementation within the scope of the present disclosure, and some illustrated features may not be required for implementation of all embodiments. In some examples, the process 1400 may be carried out by the UE 1300 illustrated in FIG. 13. In some examples, the process 1400 may be carried out by any suitable apparatus or means for carrying out the functions or algorithm described below.

At block 1402, a UE can receive first DCI to trigger an SPS configuration of a plurality of SPS occasions. In one aspect, the communication management circuitry 1140 may provide the means for receiving the first DCI via the transceiver 1310.

In an aspect, at block 1404, the UE may receive an SPS cancellation delay value indicating a delay to cancel the one or more SPS occasions after the second DCI is received by the UE. In an aspect, the SPS cancellation delay value may be received via at least one of an RRC configuration or the second DCI. In one aspect, the communication management circuitry 1140 may provide the means for receiving the SPS cancellation delay value.

At block 1406, the UE can receive second DCI including at least a redundancy version field including one or more redundancy version values. In one aspect, the communication management circuitry 1140 may provide the means for receiving the second DCI via the transceiver 1310.

In an aspect, the second DCI further comprises an SPS cancellation bitmap field including one or more bitmap values indicating the one or more SPS occasions for the SPS cancellation.

At block 1408, the UE can determine whether the second DCI indicates SPS cancellation that cancels one or more SPS occasions of the plurality of SPS occasions based at least on the one or more redundancy version values. In one aspect, the SPS management circuitry 1142 may provide the means for determining whether the second DCI indicates SPS cancellation.

In an aspect, at block 1410, the UE may determine an SPS cancellation window based on a number of the one or more bitmap values in the cancellation bitmap field, the SPS cancellation window indicating a time window to cancel the one or more SPS occasion. In one aspect, the SPS management circuitry 1142 may provide the means for determining the SPS cancellation window.

At block 1412, the UE can refrain from monitoring the one or more SPS occasions based on determining that the second DCI indicates the SPS cancellation. In one aspect, the SPS management circuitry 1142 may provide the means for refraining from monitoring the one or more SPS occasions.

In an aspect, refraining from monitoring the one or more SPS occasions may be based on the one or more bitmap values. In an aspect, refraining from monitoring the one or more SPS occasions may be performed based on the SPS cancellation delay value after receiving the second DCI.

In an aspect, determining whether the second DCI indicates the SPS cancellation may include determining that the second DCI indicates the SPS cancellation when at least one of the one or more redundancy version values in the second DCI is one.

In an aspect, the second DCI further comprises an antenna port field, a DMRS field, an initial seed field, an MCS field and an FDRA field, and at least one of the antenna port field, the DMRS field, the initial seed field, the MCS field, the FDRA field includes one or more bitmap values indicating the one or more SPS occasions for the SPS cancellation. In this aspect, refraining from monitoring the one or more SPS occasions is based on the one or more bitmap values.

In an aspect, the second DCI further includes an MCS field including one or more MCS values, and determining whether the second DCI indicates the SPS cancellation is based at least on the one or more redundancy version values and the one or more MCS values. In an aspect, determining whether the second DCI indicates the SPS cancellation may include determining that the second DCI indicates the SPS cancellation when at least one of the one or more redundancy version values is one, and wherein at least one of the one or more MCS values is zero.

In an aspect, the second DCI further comprises an antenna port field, a DMRS field, an initial seed field, and an FDRA field, and at least one of the antenna port field, the DMRS field, the initial seed field, the FDRA field includes one or more bitmap values indicating the one or more SPS occasions for the SPS cancellation. In this aspect, refraining from monitoring the one or more SPS occasions is based on the one or more bitmap values.

In an aspect, the second DCI further includes an FDRA field including a plurality of FDRA values, and determining whether the second DCI indicates the SPS cancellation is based on the one or more redundancy version values, the one or more MCS values, and the plurality of FDRA values indicate the SPS cancellation. In an aspect, determining whether the second DCI indicates the SPS cancellation may include determining that the second DCI indicates the SPS cancellation when at least one of the one or more redundancy version values is one, and at least one of the one or more MCS values is zero, and the plurality of FDRA values are zero for a first FDRA type or a dynamic switch mode or the plurality of FDRA values are one for a second FDRA type. In an aspect, the second DCI further comprises an antenna port field, a DMRS field, and an initial seed field, and at least one of the antenna port field, the DMRS field, or the initial seed field includes one or more bitmap values indicating the one or more SPS occasions for the SPS cancellation, where refraining from monitoring the one or more SPS occasions is based on the one or more bitmap values.

In one configuration, the UE 1300 for wireless communication includes means for receiving first DCI to trigger an SPS configuration of a plurality of SPS occasions, means for receiving second DCI including at least a redundancy version field including one or more redundancy version values, means for determining whether the second DCI indicates an SPS cancellation that cancels one or more SPS occasions of the plurality of SPS occasions based at least on the one or more redundancy version values, and means for refraining from monitoring the one or more SPS occasions based on determining that the second DCI indicates the SPS cancellation. In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the processor-readable storage medium 1306, or any other suitable apparatus or means described in any one of the FIGS. 1, 2, and/or 3, and utilizing, for example, the processes and/or algorithms described herein in relation to FIG. 14.

The following provides an overview of several aspects of the present disclosure.

Aspect 1: A method of wireless communication by a base station, comprising: transmitting, to the UE, first downlink control information (DCI) to trigger a semi-persistent scheduling (SPS) configuration of a plurality of SPS occasions; determining to cancel one or more SPS occasions of the plurality of SPS occasions; and transmitting second DCI to trigger an SPS cancellation that cancels the one or more SPS occasions, the second DCI including at least a redundancy version field including one or more redundancy version values to indicate the SPS cancellation.

Aspect 2: The method of aspect 1, further comprising: determining an absence of downlink data to transmit to the UE, wherein determining to cancel the one or more SPS occasions is based on determining the absence of the downlink data.

Aspect 3: The method of aspect 1 or 2, further comprising: transmitting an SPS cancellation delay value to the UE to indicate a delay to cancel the one or more SPS occasions after the second DCI is received by the UE.

Aspect 4: The method of aspect 3, wherein the SPS cancellation delay value is indicated via at least one of a radio resource control (RRC) configuration or the second DCI.

Aspect 5: The method of any of aspects 1 through 4, wherein at least one of the one or more redundancy version values is one.

Aspect 6: The method of any of aspects 1 through 5, wherein the second DCI further comprises an SPS cancellation bitmap field including one or more bitmap values indicating the one or more SPS occasions for the SPS cancellation.

Aspect 7: The method of aspect 6, wherein a number of the one or more bitmap values in the cancellation bitmap field is associated with an SPS cancellation window indicating a time window to cancel the one or more SPS occasions.

Aspect 8: The method of any of aspects 1 through 7, wherein the second DCI further comprises an antenna port field, a demodulation reference signal (DMRS) field, an initial seed field, a modulation and coding scheme (MCS) field and a frequency domain resource assignment (FDRA) field, and wherein at least one of the antenna port field, the DMRS field, the initial seed field, the MCS field, the FDRA field includes one or more bitmap values indicating the one or more SPS occasions for the SPS cancellation.

Aspect 9: The method of any of aspects 1 through 8, wherein the second DCI further includes a modulation and coding scheme (MCS) field including one or more MCS values, and wherein the one or more redundancy version values and the one or more MCS values are included in the second DCI to indicate the SPS cancellation.

Aspect 10: The method of aspect 9, wherein at least one of the one or more redundancy version values is one, and wherein at least one of the one or more MCS values is zero.

Aspect 11: The method of aspect 9, wherein the second DCI further comprises an antenna port field, a demodulation reference signal (DMRS) field, an initial seed field, and a frequency domain resource assignment (FDRA) field, and wherein at least one of the antenna port field, the DMRS field, the initial seed field, the FDRA field includes one or more bitmap values indicating the one or more SPS occasions for the SPS cancellation.

Aspect 12: The method of any of aspects 1 through 11, wherein the second DCI further includes a modulation and coding scheme (MCS) field including one or more MCS values and a frequency domain resource assignment (FDRA) field including a plurality of FDRA values, and wherein the one or more redundancy version values, the one or more MCS values, and the plurality of FDRA values are included in the second DCI to indicate the SPS cancellation.

Aspect 13: The method of aspect 12, wherein at least one of the one or more redundancy version values is one, and at least one of the one or more MCS values is zero, and wherein the plurality of FDRA values are zero for a first FDRA type or a dynamic switch mode or the plurality of FDRA values are one for a second FDRA type.

Aspect 14: The method of aspect 12, wherein the second DCI further comprises an antenna port field, a demodulation reference signal (DMRS) field, and an initial seed field, and wherein at least one of the antenna port field, the DMRS field, or the initial seed field includes one or more bitmap values indicating the one or more SPS occasions for the SPS cancellation.

Aspect 15: A base station comprising: a transceiver configured to communicate with a radio access network, a memory, and at least one processor communicatively coupled to the transceiver and the memory, wherein the at least one processor and the memory are configured to perform any one of aspects 1 through 14.

Aspect 16: A base station configured for wireless communication comprising at least one means for performing any one of aspects 1 through 14.

Aspect 17: A non-transitory processor-readable storage medium having instructions for a base station thereon, wherein the instructions, when executed by a processing circuit, cause the processing circuit to perform any one of aspects 1 through 14.

Aspect 18: A method of wireless communication by a user equipment (UE), comprising: receiving first downlink control information (DCI) to trigger a semi-persistent scheduling (SPS) configuration of a plurality of SPS occasions; receiving second DCI including at least a redundancy version field including one or more redundancy version values; determining whether the second DCI indicates SPS cancellation that cancels one or more SPS occasions of the plurality of SPS occasions based at least on the one or more redundancy version values; and refraining from monitoring the one or more SPS occasions based on determining that the second DCI indicates the SPS cancellation.

Aspect 19: The method of aspect 18, wherein determining whether the second DCI indicates the SPS cancellation comprises: determining that the second DCI indicates the SPS cancellation when at least one of the one or more redundancy version values in the second DCI is one.

Aspect 20: The method of aspects 18 or 19, further comprising: receiving an SPS cancellation delay value indicating a delay to cancel the one or more SPS occasions after the second DCI is received by the UE, wherein refraining from monitoring the one or more SPS occasions is performed based on the SPS cancellation delay value after receiving the second DCI.

Aspect 21: The method of aspect 20, wherein the SPS cancellation delay value is received via at least one of a radio resource control (RRC) configuration or the second DCI.

Aspect 22: The method of any of aspects 18-21, wherein the second DCI further comprises an SPS cancellation bitmap field including one or more bitmap values indicating the one or more SPS occasions for the SPS cancellation, and wherein refraining from monitoring the one or more SPS occasions is based on the one or more bitmap values.

Aspect 23: The method of aspect 22, further comprising: determining an SPS cancellation window based on a number of the one or more bitmap values in the cancellation bitmap field, the SPS cancellation window indicating a time window to cancel the one or more SPS occasion, wherein refraining from monitoring the one or more SPS occasions is performed within the SPS cancellation window.

Aspect 24: The method of any of aspects 18-23, wherein the second DCI further comprises an antenna port field, a demodulation reference signal (DMRS) field, an initial seed field, a modulation and coding scheme (MCS) field and a frequency domain resource assignment (FDRA) field, wherein at least one of the antenna port field, the DMRS field, the initial seed field, the MCS field, the FDRA field includes one or more bitmap values indicating the one or more SPS occasions for the SPS cancellation, and wherein refraining from monitoring the one or more SPS occasions is based on the one or more bitmap values.

Aspect 25: The method of any of aspects 18-24, wherein the second DCI further includes a modulation and coding scheme (MCS) field including one or more MCS values, and wherein determining whether the second DCI indicates the SPS cancellation is based at least on the one or more redundancy version values and the one or more MCS values.

Aspect 26: The method of aspect 25, wherein determining whether the second DCI indicates the SPS cancellation comprises: determining that the second DCI indicates the SPS cancellation when at least one of the one or more redundancy version values is one, and wherein at least one of the one or more MCS values is zero.

Aspect 27: The method of aspect 25, wherein the second DCI further comprises an antenna port field, a demodulation reference signal (DMRS) field, an initial seed field, and a frequency domain resource assignment (FDRA) field, wherein at least one of the antenna port field, the DMRS field, the initial seed field, the FDRA field includes one or more bitmap values indicating the one or more SPS occasions for the SPS cancellation, and wherein refraining from monitoring the one or more SPS occasions is based on the one or more bitmap values.

Aspect 28: The method of aspect 25, wherein the second DCI further includes a frequency domain resource assignment (FDRA) field including a plurality of FDRA values, and wherein determining whether the second DCI indicates the SPS cancellation is based on the one or more redundancy version values, the one or more MCS values, and the plurality of FDRA values indicate the SPS cancellation.

Aspect 29: The method of aspect 28, wherein determining whether the second DCI indicates the SPS cancellation comprises: determining that the second DCI indicates the SPS cancellation when at least one of the one or more redundancy version values is one, and at least one of the one or more MCS values is zero, and the plurality of FDRA values are zero for a first FDRA type or a dynamic switch mode or the plurality of FDRA values are one for a second FDRA type.

Aspect 30: The method of aspect 28, wherein the second DCI further comprises an antenna port field, a demodulation reference signal (DMRS) field, and an initial seed field, and wherein at least one of the antenna port field, the DMRS field, or the initial seed field includes one or more bitmap values indicating the one or more SPS occasions for the SPS cancellation, and wherein refraining from monitoring the one or more SPS occasions is based on the one or more bitmap values.

Aspect 31: A UE comprising: a transceiver configured to communicate with a radio access network, a memory, and at least one processor communicatively coupled to the transceiver and the memory, wherein the at least one processor and the memory are configured to perform any one of aspects 18 through 30.

Aspect 32: A UE configured for wireless communication comprising at least one means for performing any one of aspects 18 through 30.

Aspect 33: A non-transitory processor-readable storage medium having instructions for a UE thereon, wherein the instructions, when executed by a processing circuit, cause the processing circuit to perform any one of aspects 18 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A base station for wireless communication, comprising:
   at least one processor;
   a transceiver communicatively coupled to the at least one processor; and
   a memory communicatively coupled to the at least one processor,
   determine an absence of downlink data to transmit to the UE,
      determine an absence of downlink data to transmit to the UE;
      transmit, to a user equipment (UE), first downlink control information (DCI) to trigger a semi-persistent scheduling (SPS) configuration of a plurality of SPS occasions;
      determine to cancel one or more SPS occasions of the plurality of SPS occasions based on determining the absence of the downlink data; and
      transmit second DCI to trigger an SPS cancellation that cancels the one or more SPS occasions, the second DCI including at least a redundancy version field including one or more redundancy version values to indicate the SPS cancellation.

2. The base station of claim 1, wherein the at least one processor is further configured to:
   transmit an SPS cancellation delay value to the UE to indicate a delay to cancel the one or more SPS occasions after the second DCI is received by the UE.

3. The base station of claim 1, wherein at least one of the one or more redundancy version values is one.

4. The base station of claim 1, wherein the second DCI further comprises an SPS cancellation bitmap field including one or more bitmap values indicating the one or more SPS occasions for the SPS cancellation.

5. The base station of claim 4, wherein a number of the one or more bitmap values in the cancellation bitmap field is associated with an SPS cancellation window indicating a time window to cancel the one or more SPS occasions.

6. The base station of claim 1, wherein the second DCI further comprises an antenna port field, a demodulation reference signal (DMRS) field, an initial seed field, a modulation and coding scheme (MCS) field and a frequency domain resource assignment (FDRA) field, and
wherein at least one of the antenna port field, the DMRS field, the initial seed field, the MCS field, the FDRA field includes one or more bitmap values indicating the one or more SPS occasions for the SPS cancellation.

7. The base station of claim 1, wherein the second DCI further includes a modulation and coding scheme (MCS) field including one or more MCS values, and
wherein the one or more redundancy version values and the one or more MCS values are included in the second DCI to indicate the SPS cancellation.

8. The base station of claim 7, wherein at least one of the one or more redundancy version values is one, and wherein at least one of the one or more MCS values is zero.

9. The base station of claim 7, wherein the second DCI further comprises an antenna port field, a demodulation reference signal (DMRS) field, an initial seed field, and a frequency domain resource assignment (FDRA) field, and
wherein at least one of the antenna port field, the DMRS field, the initial seed field, the FDRA field includes one or more bitmap values indicating the one or more SPS occasions for the SPS cancellation.

10. The base station of claim 1, wherein the second DCI further includes a modulation and coding scheme (MCS) field including one or more MCS values and a frequency domain resource assignment (FDRA) field including a plurality of FDRA values, and
wherein the one or more redundancy version values, the one or more MCS values, and the plurality of FDRA values are included in the second DCI to indicate the SPS cancellation.

11. The base station of claim 10, wherein at least one of the one or more redundancy version values is one, and at least one of the one or more MCS values is zero, and
wherein the plurality of FDRA values are zero for a first FDRA type or a dynamic switch mode or the plurality of FDRA values are one for a second FDRA type.

12. The base station of claim 10, wherein the second DCI further comprises an antenna port field, a demodulation reference signal (DMRS) field, and an initial seed field, and
wherein at least one of the antenna port field, the DMRS field, or the initial seed field includes one or more bitmap values indicating the one or more SPS occasions for the SPS cancellation.

13. A method of wireless communication by a base station, comprising:
transmitting, to a user equipment (UE), first downlink control information (DCI) to trigger a semi-persistent scheduling (SPS) configuration of a plurality of SPS occasions;
determining an absence of downlink data to transmit to the UE;
determining to cancel one or more SPS occasions of the plurality of SPS occasions based on determining the absence of the downlink data; and
transmitting second DCI to trigger an SPS cancellation that cancels the one or more SPS occasions, the second DCI including at least a redundancy version field including one or more redundancy version values to indicate the SPS cancellation.

14. The method of claim 13, further comprising:
transmitting an SPS cancellation delay value to the UE to indicate a delay to cancel the one or more SPS occasions after the second DCI is received by the UE.

15. A user equipment (UE) for wireless communication, comprising:
at least one processor;
a transceiver communicatively coupled to the at least one processor; and
a memory communicatively coupled to the at least one processor,
wherein the at least one processor is configured to:
receive first downlink control information (DCI) to trigger a semi-persistent scheduling (SPS) configuration of a plurality of SPS occasions;
receive second DCI including at least a redundancy version field including one or more redundancy version values;
determine whether the second DCI indicates SPS cancellation that cancels one or more SPS occasions of the plurality of SPS occasions based at least on the one or more redundancy version values when at least one of the one or more redundancy version values in the second DCI is one; and
refrain from monitoring the one or more SPS occasions based on determining that the second DCI indicates the SPS cancellation.

16. The UE of claim 15, wherein the at least one processor is further configured to:
receive an SPS cancellation delay value indicating a delay to cancel the one or more SPS occasions after the second DCI is received by the UE,
wherein the at least one processor configured to refrain from monitoring the one or more SPS occasions is configured to refrain from monitoring the one or more SPS occasions based on the SPS cancellation delay value after receiving the second DCI.

17. The UE of claim 15, wherein the second DCI further comprises an SPS cancellation bitmap field including one or more bitmap values indicating the one or more SPS occasions for the SPS cancellation, and
wherein the at least one processor configured to refrain from monitoring the one or more SPS occasions is configured to refrain from monitoring the one or more SPS occasions based on the one or more bitmap values.

18. The UE of claim 17, wherein the at least one processor is further configured to:
determine an SPS cancellation window based on a number of the one or more bitmap values in the cancellation bitmap field, the SPS cancellation window indicating a time window to cancel the one or more SPS occasion,
wherein the at least one processor configured to refrain from monitoring the one or more SPS occasions is configured to refrain from monitoring the one or more SPS occasions within the SPS cancellation window.

19. The UE of claim 15, wherein the second DCI further comprises an antenna port field, a demodulation reference signal (DMRS) field, an initial seed field, a modulation and coding scheme (MCS) field and a frequency domain resource assignment (FDRA) field,
wherein at least one of the antenna port field, the DMRS field, the initial seed field, the MCS field, the FDRA field includes one or more bitmap values indicating the one or more SPS occasions for the SPS cancellation, and
wherein the at least one processor configured to refrain from monitoring the one or more SPS occasions is configured to refrain from monitoring the one or more SPS occasions based on the one or more bitmap values.

20. The UE of claim 15, wherein the second DCI further includes a modulation and coding scheme (MCS) field including one or more MCS values, and
wherein the at least one processor configured to determine whether the second DCI indicates the SPS cancellation is configured to determine whether the second DCI indicates the SPS cancellation based at least on the one or more redundancy version values and the one or more MCS values.

21. The UE of claim 20, wherein the at least one processor configured to determine whether the second DCI indicates the SPS cancellation is configured to:
determine that the second DCI indicates the SPS cancellation when at least one of the one or more redundancy version values is one, and wherein at least one of the one or more MCS values is zero.

22. The UE of claim 20, wherein the second DCI further comprises an antenna port field, a demodulation reference signal (DMRS) field, an initial seed field, and a frequency domain resource assignment (FDRA) field,
wherein at least one of the antenna port field, the DMRS field, the initial seed field, the FDRA field includes one or more bitmap values indicating the one or more SPS occasions for the SPS cancellation, and
wherein the at least one processor configured to refrain from monitoring the one or more SPS occasions is configured to refrain from monitoring the one or more SPS occasions based on the one or more bitmap values.

23. The UE of claim 20, wherein the second DCI further includes a frequency domain resource assignment (FDRA) field including a plurality of FDRA values, and
wherein the at least one processor configured to determine whether the second DCI indicates the SPS cancellation is configured to determine whether the second DCI indicates the SPS cancellation based on the one or more redundancy version values, the one or more MCS values, and the plurality of FDRA values indicate the SPS cancellation.

24. The UE of claim 23, wherein the at least one processor configured to determine whether the second DCI indicates the SPS cancellation is configured to:
determine that the second DCI indicates the SPS cancellation when
at least one of the one or more redundancy version values is one, and at least one of the one or more MCS values is zero, and
the plurality of FDRA values are zero for a first FDRA type or a dynamic switch mode or the plurality of FDRA values are one for a second FDRA type.

25. The UE of claim 23, wherein the second DCI further comprises an antenna port field, a demodulation reference signal (DMRS) field, and an initial seed field, and
wherein at least one of the antenna port field, the DMRS field, or the initial seed field includes one or more bitmap values indicating the one or more SPS occasions for the SPS cancellation, and
wherein refraining from monitoring the one or more SPS occasions is based on the one or more bitmap values.

26. A method of wireless communication by a user equipment (UE), comprising:
receiving first downlink control information (DCI) to trigger a semi-persistent scheduling (SPS) configuration of a plurality of SPS occasions;
receiving second DCI including at least a redundancy version field including one or more redundancy version values;
determining whether the second DCI indicates SPS cancellation that cancels one or more SPS occasions of the plurality of SPS occasions based at least on the one or more redundancy version values when at least one of the one or more redundancy version values in the second DCI is one; and
refraining from monitoring the one or more SPS occasions based on determining that the second DCI indicates the SPS cancellation.

* * * * *